United States Patent
Shiokawa et al.

(10) Patent No.: US 10,582,075 B2
(45) Date of Patent: Mar. 3, 2020

(54) IMAGE FORMING APPARATUS AND CONVEYANCE CONTROL METHOD

(71) Applicant: Konica Minolta, Inc., Chiyoda-ku, Tokyo (JP)

(72) Inventors: Yasuo Shiokawa, Tokyo (JP); Yoshiteru Kawakami, Tokyo (JP); Takahiro Okubo, Kanagawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/959,408

(22) Filed: Apr. 23, 2018

(65) Prior Publication Data

US 2018/0309886 A1 Oct. 25, 2018

(30) Foreign Application Priority Data

Apr. 24, 2017 (JP) .................................. 2017-085327
Apr. 24, 2017 (JP) .................................. 2017-085331

(Continued)

(51) Int. Cl.
*G06K 15/00* (2006.01)
*H04N 1/00* (2006.01)
(Continued)

(52) U.S. Cl.
CPC .......... *H04N 1/00602* (2013.01); *B65H 9/166* (2013.01); *G03G 15/2053* (2013.01);
(Continued)

(58) Field of Classification Search
CPC ........... H04N 1/00602; H04N 1/00652; H04N 1/00681; H04N 1/0066; H04N 1/00824;
(Continued)

(56) References Cited

U.S. PATENT DOCUMENTS

2005/0013641 A1* 1/2005 Kobayashi ......... G03G 15/6511
399/394
2007/0127964 A1* 6/2007 Okamoto ............. G03G 15/234
399/395

(Continued)

FOREIGN PATENT DOCUMENTS

EP          1 793 285 A2    6/2007
JP          2014-133634 A   7/2014

OTHER PUBLICATIONS

Extended European Search Report dated Nov. 30, 2018, issued by the European Patent Office in corresponding European Application No. 18166764.3. (11 pages).

Office Action (Notification of First Office Action) dated Apr. 26, 2019, by the State Intellectual Property Office of the People's Republic of China in corresponding Chinese Patent Application No. 201810345841.4 and an English Translation of the Office Action (38 pages).

(Continued)

*Primary Examiner* — Moustapha Diaby
(74) *Attorney, Agent, or Firm* — Buchanan Ingersoll & Rooney PC

(57) ABSTRACT

An image forming apparatus includes: a transfer section that transfers an image to a sheet; a sheet conveyance member that is provided on an upstream of the transfer section in a sheet conveyance direction and that conveys the sheet; and a hardware processor that controls the sheet conveyance member to displace the sheet, wherein a preset value defining a displacement condition of the sheet conveyance member for providing a correct position of the image on the sheet is set.

19 Claims, 11 Drawing Sheets

(30) Foreign Application Priority Data

Apr. 24, 2017 (JP) ................................. 2017-085333
Apr. 24, 2017 (JP) ................................. 2017-085337

(51) Int. Cl.

| | | |
|---|---|---|
| *G06F 3/12* | (2006.01) | |
| *G03G 15/20* | (2006.01) | |
| *G03G 15/00* | (2006.01) | |
| *B65H 9/16* | (2006.01) | |

(52) U.S. Cl.
CPC ..... *G03G 15/6564* (2013.01); *G03G 15/6567* (2013.01); *G06F 3/1237* (2013.01); *H04N 1/0066* (2013.01); *H04N 1/00774* (2013.01); *H04N 1/00785* (2013.01); *H04N 1/00824* (2013.01); *G03G 2215/00561* (2013.01); *H04N 1/00748* (2013.01)

(58) Field of Classification Search
CPC ............... H04N 1/00748; B65H 9/166; G03G 15/2053; G03G 15/6567; G03G 2215/00561; G06F 3/1237
See application file for complete search history.

(56) References Cited

U.S. PATENT DOCUMENTS

| | | | |
|---|---|---|---|
| 2010/0296854 A1 | 11/2010 | Otsuki et al. | |
| 2011/0081181 A1 | 4/2011 | Saito | |
| 2012/0141179 A1* | 6/2012 | Atsumi | G03G 15/6567 399/381 |
| 2013/0188210 A1* | 7/2013 | Mukaiyama | H04N 1/00015 358/1.13 |
| 2014/0193186 A1* | 7/2014 | Furuyama | G03G 15/657 399/388 |
| 2015/0023711 A1* | 1/2015 | Kawanago | G03G 15/6558 399/394 |
| 2015/0023712 A1* | 1/2015 | Kawabata | G03G 15/6561 399/394 |
| 2017/0045854 A1 | 2/2017 | Miyake et al. | |
| 2017/0235254 A1* | 8/2017 | Deno | G03G 15/16 399/394 |

OTHER PUBLICATIONS

European Office Action issued by the European Patent Office in Application No. 18 166 764.3 dated Dec. 2, 2019 (8 pgs).

* cited by examiner

IMAGE FORMING APPARATUS AND CONVEYANCE CONTROL METHOD

CROSS REFERENCE TO RELATED APPLICATIONS

Japanese Patent Application No. 2017-085327, No. 2017-085331, No. 2017-085333 and No. 2017-085337, each filed on Apr. 24, 2017, including description, claims, drawings and abstract the entire disclosure are incorporated herein by reference in their entirety.

BACKGROUND

Technological Field

The present invention relates to an image forming apparatus and a conveyance control method.

Description of Related Art

In general, an image forming apparatus (such as a printer, a copier, and a facsimile machine) using an electrophotographic processing technique applies (exposes) laser light on the basis of image data to a charged photoconductor drum (image bearing member) to form an electrostatic latent image. In the image forming apparatus, a developing unit supplies toner to the photoconductor drum provided with the electrostatic latent image to visualize the electrostatic latent image to form a toner image. The image forming apparatus further primarily or secondarily transfers the toner image to a sheet and heats and pressurizes the sheet by a fixing nip of a fixing unit to fix the toner image on the sheet. The image forming apparatus is also provided with registration rollers that correct positional deviation of the sheet in a width direction, on an upstream of a transfer section that transfers the image to the sheet (for example, see Japanese Patent Application Laid-Open No. 2014-133634 (hereinafter, referred to as PTL 1)).

By the way, the image forming apparatus has a problem of occurrence of a phenomenon (sub scanning obliqueness) in that a conveyance direction of the sheet is passed obliquely in a sub scanning direction due to misalignment from the registration rollers to the fixing nip through the secondary transfer nip. In addition to the case of the misalignment, the sub scanning obliqueness is likely to occur when there is a difference between the diameters at opposite ends of the rollers in the sheet width direction (sub scanning direction) due to a durability issue or the like. A long sheet with a long size in the conveyance direction is easily affected, and the sub scanning obliqueness often occurs. The sub scanning obliqueness leads to a poor image due to deviation, distortion, or the like of the image transferred at the transfer section, and a technique for reducing the sub scanning obliqueness is demanded.

To counter the problem, the registration rollers can be displaced to control skew correction to eliminate the sub scanning obliqueness on some level. On the other hand, although the control can correct a front-end side of the sheet in the conveyance direction, a rear-end side of the sheet is still tilted. The distortion remains between the front-end and the rear-end of the sheet, and it is difficult to eliminate the sub scanning obliqueness.

A technique of registration displacement control is also described in PTL 1, in which a line sensor is disposed between the registration rollers and transfer rollers, the line sensor detects a sheet edge position while the transfer rollers convey the sheet, and the registration rollers are moved based on the detection result.

However, in the registration displacement control described in PTL 1, the longer the length of the sheet in the conveyance direction is, the more the displacement operation of the registration rollers needs to be repeatedly performed. Therefore, there is a problem that the irradiation time of the line sensor increases, and the life of the line sensor is reduced.

SUMMARY

An object of the preset invention is to provide an image forming apparatus and a conveyance control method that can correct a sub scanning obliqueness of a sheet without depending on a detection result of a line sensor or with reduced use of the line sensor.

In order to realize at least one of the above objects, an image forming apparatus reflecting an aspect of the present invention includes: a transferer that transfers an image to a sheet; a sheet conveyance member that is provided on an upstream of the transferer in a sheet conveyance direction and that conveys the sheet; and a hardware processor that controls the sheet conveyance member to displace the sheet, in which a preset value defining a displacement condition of the sheet conveyance member for providing a correct position of the image on the sheet is set.

According to still another aspect of the present invention, a conveyance control method of an image forming apparatus includes: a transferer that transfers an image to a sheet; and a sheet conveyance member that is provided on an upstream of the transferer in a sheet conveyance direction and that conveys the sheet, the conveyance control method including displacing the sheet conveyance member based on a preset value defining a displacement condition of the sheet conveyance member for providing a correct position of the image on the sheet.

According to still another aspect of the present invention, an image forming apparatus includes: a transferer that transfers an image to a sheet; a sheet conveyance member that is provided on an upstream of the transferer in a sheet conveyance direction and that conveys the sheet; and a hardware processor that uses a preset value defining a displacement condition of the sheet conveyance member for providing a correct position of the image on the sheet to thereby control the sheet conveyance member to displace the sheet in a width direction orthogonal to the sheet conveyance direction, in which the hardware processor operates a detection unit that detects an edge of the sheet in the width direction at a predetermined timing to correct the preset value based on a detection result of the detection unit.

According to still another aspect of the present invention, an image forming apparatus includes: a transferer that transfers an image to a sheet; a sheet conveyance member that is provided on an upstream of the transferer in a sheet conveyance direction; and a hardware processor that uses a preset value defining a displacement condition of the sheet conveyance member for providing a correct position of the image on the sheet to thereby control displacement of the sheet conveyance member to displace the sheet in a width direction orthogonal to the sheet conveyance direction, in which the hardware processor uses a value obtained by correcting the preset value based on a reading result of an image reading unit that reads the image on the sheet to control the displacement for a subsequent sheet.

According to still another aspect of the present invention, an image forming apparatus includes: transferer that transfers an image to a sheet; a sheet conveyance member that is provided on an upstream of the transferer in a sheet conveyance direction; and a hardware processor that controls displacement of the sheet conveyance member to displace the sheet in a width direction orthogonal to the sheet conveyance direction, in which the hardware processor executes first control of controlling the displacement based on a detection result of a detection unit that detects an edge of the sheet in the width direction before a front-end of the sheet enters the transferer and executes, based on details of the first control, second control of controlling the displacement by using a preset value defining displacement condition of the sheet conveyance member for providing a correct position of the image on the sheet after the front-end of the sheet enters the transferer.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

(Embodiment 1)

Figure 1:
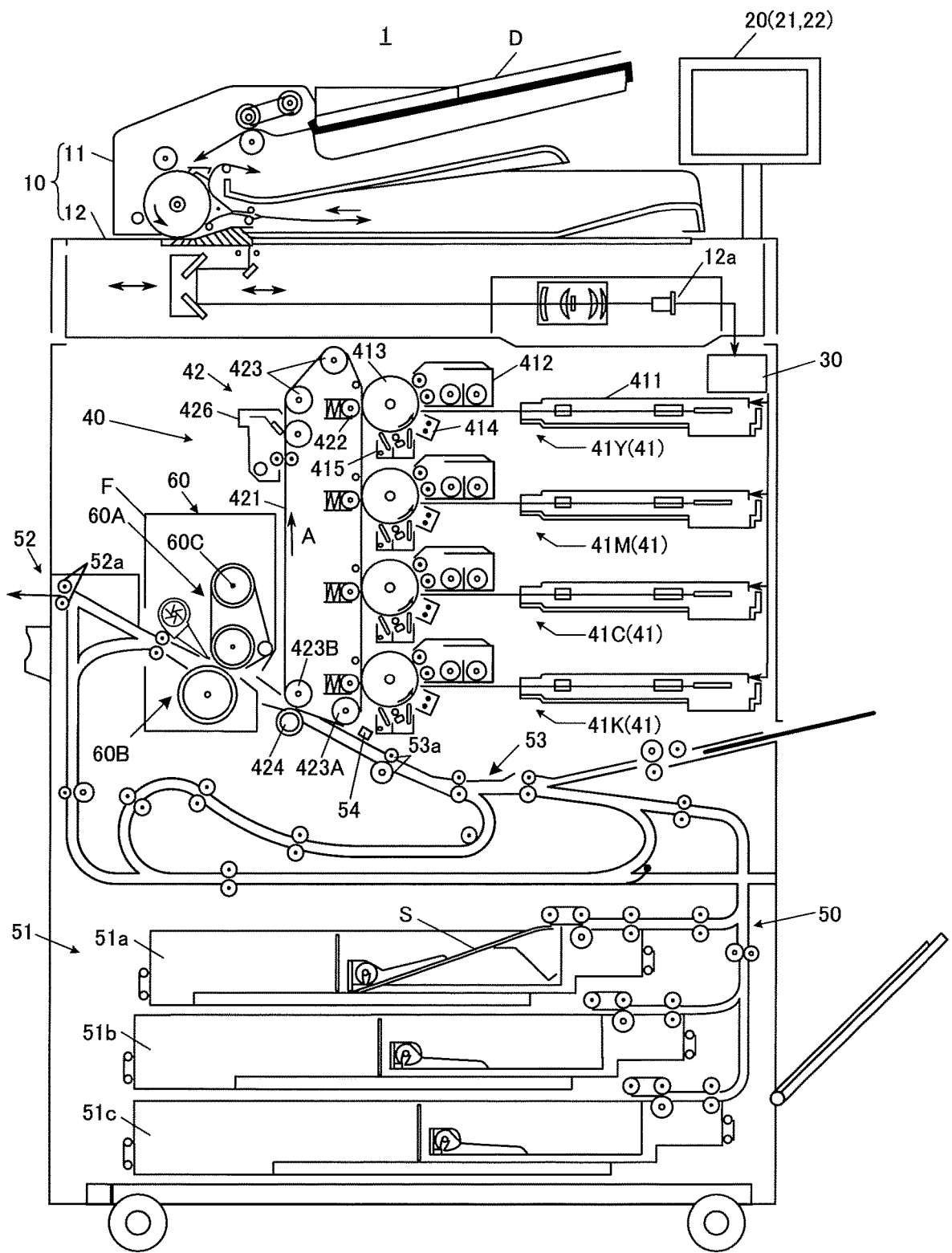
FIG. 1 schematically illustrates an overall configuration of an image forming apparatus according to the present Embodiment.
Figure 2:
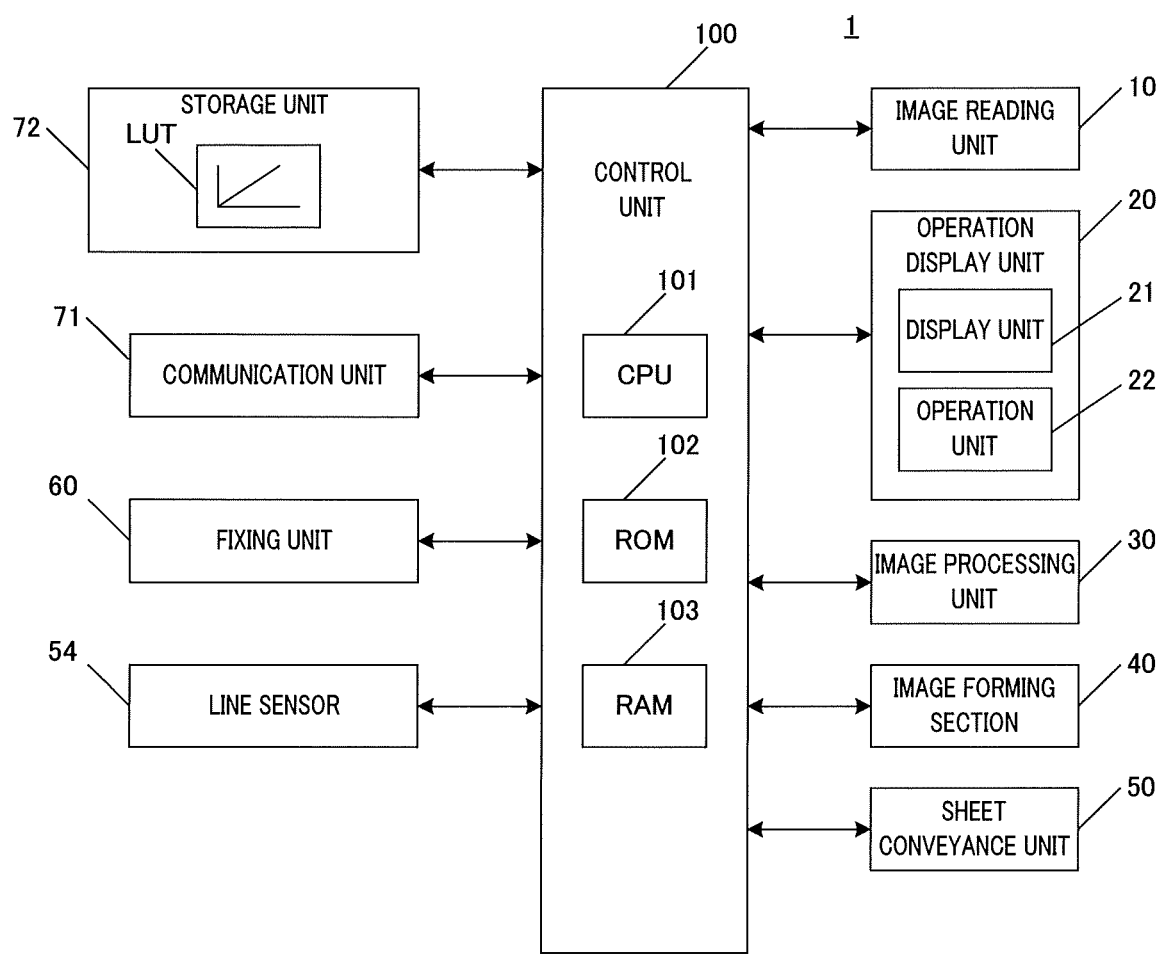
FIG. 2 is a block diagram showing main parts of a control system of the image forming apparatus of FIG. 1.

Hereinafter, various Embodiments of the present invention will be described in detail with reference to the accompanying drawings. FIG. 1 schematically illustrates an overall configuration of image forming apparatus 1 according to the present Embodiment. FIG. 2 shows main parts of a control system of image forming apparatus 1 according to the present Embodiment.

Image forming apparatus 1 of the present Embodiment uses a long sheet or a non-long sheet as sheet S and forms an image on sheet S.

In the present Embodiment, the long sheet is a piece of paper with a length in a conveyance direction longer than regularly used sheets, such as A4 size and A3 size, and has a length such that the long sheet cannot be housed in sheet feed tray units 51a to 51c in the apparatus. Hereinafter, when the sheet is simply referred to as "sheet", the sheet can be either a long sheet or a non-long sheet.

Image forming apparatus 1 is a color image forming apparatus of an intermediate transfer system using an electrophotographic process technique. More specifically, image forming apparatus 1 primarily transfers toner images of colors Y (yellow), M (magenta), C (cyan), and K (black) formed on photoconductor drums 413 to intermediate transfer belt 421 and places the toner images of four colors on top of each other on intermediate transfer belt 421. Image forming apparatus 1 then secondarily transfers the toner images to the sheet to form a toner image.

A tandem system is adopted in image forming apparatus 1, in which photoconductor drums 413 corresponding to four colors of YMCK are disposed in series in a traveling direction of intermediate transfer belt 421, and the toner images of the colors are sequentially transferred to intermediate transfer belt 421 in one procedure.

As shown in FIG. 2, image forming apparatus 1 includes image reading unit 10, operation display unit 20, image processing unit 30, image forming section 40, sheet conveyance unit 50, fixing unit 60, control unit 100, and the like.

Control unit 100 includes CPU (Central Processing Unit) 101, ROM (Read Only Memory) 102, RAM (Random Access Memory) 103, and the like. CPU 101 reads a program according to details of processing from ROM 102 and loads the program in RAM 103. CPU 101 comprehensively controls the operation of blocks of image forming apparatus 1 in cooperation with the loaded program. In this case, CPU 101 references various types of data stored in storage unit 72. Storage unit 72 includes, for example, a non-volatile semiconductor memory (so-called flash memory) or a hard disk drive.

Control unit 100 transmits and receives various types of data to and from an external apparatus (for example, personal computer) connected to a communication network, such as LAN (Local Area Network) and WAN (Wide Area Network), through communication unit 71. For example, control unit 100 receives image data transmitted from the external apparatus and forms a toner image on the sheet based on the image data (input image data). Communication unit 71 includes, for example, a communication control card such as a LAN card.

Image reading unit 10 includes automatic original sheet feeding apparatus 11 called an ADF (Auto Document Feeder), original image scanning apparatus 12 (scanner), and the like.

Automatic original sheet feeding apparatus 11 conveys original D mounted on an original tray based on a conveyance mechanism and sends out original D to original image scanning apparatus 12. Automatic original sheet feeding apparatus 11 can continuously read, without pausing, images (including double-sided) of many pieces of original D mounted on the original tray.

Original image scanning apparatus 12 optically scans the original conveyed onto a contact glass from automatic original sheet feeding apparatus 11 or the original mounted on the contact glass and forms an image on a light-receiving surface of CCD (Charge Coupled Device) sensor 12a based on reflected light from the original to thereby read the original image. Image reading unit 10 generates input image data based on the reading result of original image scanning apparatus 12. Image processing unit 30 applies predetermined image processing to the input image data.

Operation display unit 20 includes, for example, a liquid crystal display (LCD) with a touch panel and functions as display unit 21 and operation unit 22. Display unit 21 displays various operation screens, states of images, operation conditions of functions, and the like according to display control signals input from control unit 100. Operation unit 22 includes various operation keys, such as numeric keys and a start key. Operation unit 22 receives various input operations by the user and outputs operation signals to control unit 100.

Image processing unit 30 includes a circuit or the like that applies digital image processing to the input image data according to initial setting or user setting. For example, image processing unit 30 performs tone correction based on tone correction data (tone correction table LUT) in storage unit 72 under the control of control unit 100. Other than the tone correction, image processing unit 30 also applies various correction processes, such as color correction and shading correction, compression processing, and the like to the input image data. Image forming section 40 is controlled based on the processed image data.

Image forming section 40 includes: image forming units 41Y, 41M, 41C, and 41K that form images using colored toners of Y component, M component, C component, and K component based on the input image data; intermediate transfer unit 42; and the like.

Image forming units 41Y, 41M, 41C, and 41K for Y component, M component, C component, and K component have similar configurations. For the convenience of the illustration and the description, common constituent elements are indicated by the same reference signs, and Y, M, C and K are attached to the reference signs to distinguish the constituent elements. In FIG. 1, the reference signs are provided only to the constituent elements of image forming unit 41Y for Y component, and the reference signs are not illustrated for the constituent elements of the other image forming units 41M, 41C, and 41K.

Image forming unit 41 includes exposing device 411, developing device 412, photoconductor drum 413, charging device 414, drum cleaning apparatus 415, and the like.

Photoconductor drum 413 is, for example, a negative charge type organic photo-conductor (OPC) including an under coat layer (UCL), a charge generation layer (CGL), and a charge transport layer (CTL) sequentially laminated on a peripheral surface of an aluminum conductive cylindrical body (aluminum tube). The charge generation layer is made of an organic semiconductor in which a charge generation material (for example, phthalocyanine pigment) is dispersed on a resin binder (for example, polycarbonate), and the charge generation layer generates a pair of positive charge and negative charge based on exposure by exposing device 411. The charge transport layer is a layer in which a hole transport material (electron-donating nitrogen-containing compound) is dispersed on a resin binder (for example, polycarbonate resin), and the charge transport layer transports the positive charge generated by the charge generation layer to the surface of the charge transport layer.

Control unit 100 rotates photoconductor drum 413 at a constant circumferential speed (linear speed) by controlling a drive current supplied to a drive motor (not shown) that rotates photoconductor drum 413.

Charging device 414 uniformly applies a negative charge to the photoconductive surface of photoconductor drum 413. Exposing device 411 includes, for example, a semiconductor laser and applies laser light to photoconductor drum 413 according to the image of each color component. As a result, an electrostatic latent image of each color component is formed on the surface of photoconductor drum 413 due to the potential difference between the surface and the surroundings.

Developing device 412 is, for example, a two-component development type developing device, and developing device 412 attaches the toner of each color component to the surface of photoconductor drum 413 to visualize the electrostatic latent image to form the toner image.

Drum cleaning apparatus 415 includes a cleaning member or the like brought into sliding contact with the surface of photoconductor drum 413. A cleaning blade in drum cleaning apparatus 415 removes the remaining transfer toner left on the surface of photoconductor drum 413 after the primary transfer.

Intermediate transfer unit 42 includes intermediate transfer belt 421, primary transfer roller 422, a plurality of support rollers 423, secondary transfer roller 424, belt cleaning apparatus 426, and the like.

Intermediate transfer belt 421 includes an endless belt and is stretched by a plurality of support rollers 423 in a loop shape. At least one of support rollers 423 is a driving roller, and other support rollers 423 are driven rollers. For example, it is preferable that roller 423A disposed on the downstream of primary transfer roller 422 for K component in the belt traveling direction be a driving roller. As a result, the traveling speed of the belt in the primary transfer section can be easily maintained at a constant speed. Driving roller 423A rotates, and intermediate transfer belt 421 travels at a constant speed in an arrow A direction.

Primary transfer roller 422 faces photoconductor drum 413 of each color component and is disposed on an inner peripheral side of intermediate transfer belt 421. Primary transfer roller 422 is pressed against photoconductor drum 413 across intermediate transfer belt 421, and a primary transfer nip for transferring the toner image from photoconductor drum 413 to intermediate transfer belt 421 is formed.

Secondary transfer roller 424 faces backup roller 423B disposed on the downstream of driving roller 423A in the belt traveling direction, and secondary transfer roller 424 is disposed on an outer peripheral side of intermediate transfer belt 421. Secondary transfer roller 424 is pressed against backup roller 423B across intermediate transfer belt 421, and a secondary transfer nip for transferring the toner image from intermediate transfer belt 421 to sheet S is formed.

The secondary transfer nip formed by intermediate transfer belt 421, backup roller 423B, and secondary transfer roller 424 corresponds to a "transfer section" of the present invention.

When intermediate transfer belt 421 passes through the primary transfer nip, the toner images on photoconductor drums 413 are primarily transferred to intermediate transfer belt 421 and sequentially placed on top of each other. Specifically, a primary transfer bias is applied to primary transfer roller 422 to provide a charge with a polarity opposite the toner to the side of intermediate transfer belt 421 coming into contact with primary transfer roller 422, and the toner images are electrostatically transferred to intermediate transfer belt 421.

Subsequently, when the sheet passes through the secondary transfer nip, the toner images on intermediate transfer belt 421 are secondarily transferred to the sheet. Specifically, a secondary transfer bias is applied to secondary transfer roller 424 to provide a charge with a polarity opposite the toner to the side of the sheet coming into contact with secondary transfer roller 424, and the toner images are electrostatically transferred to the sheet. The sheet provided with the toner images is conveyed toward fixing unit 60.

Belt cleaning apparatus 426 includes a belt cleaning blade or the like in sliding contact with the surface of intermediate transfer belt 421 and removes the remaining transfer toner left on the surface of intermediate transfer belt 421 after the secondary transfer.

Fixing unit 60 includes: upper fixing unit 60A including a fixing surface member disposed on the fixing surface side of the sheet; lower fixing unit 60B including a back surface support member disposed on the opposite side of the fixing surface of the sheet; heat source 60C; and the like. The back surface support member is pressed against the fixing surface member to form a fixing nip for sandwiching and conveying the sheet.

Fixing unit 60 fixes the toner image to the sheet by heating and pressurizing, by the fixing nip, the conveyed sheet provided with the secondarily transferred toner image. Fixing unit 60 is disposed as a unit in fixing device F.

Sheet conveyance unit 50 includes sheet feeding unit 51, sheet ejection unit 52, conveyance path unit 53, and the like. Three sheet feed tray units 51a to 51c of sheet feeding unit 51 hold sheets S (standard sheets, special sheets) according to preset types identified based on the basis weight (stiffness), the size, and the like. Conveyance path unit 53 includes a plurality of conveyance rollers such as registration roller pair 53a, a double-sided conveyance path for forming images on both sides of the sheet, and the like. Registration roller pair 53a corresponds to a "sheet conveyance member" of the present invention.

Registration roller pair 53a corrects the position of sheet S in the width direction under the control of control unit 100. Specifically, when sheet S is sandwiched between nips of registration roller pair 53a, control of registration displacement for moving registration roller pair 53a in the width direction to move sheet S is performed, and the position of sheet S in the width direction is corrected. Details of the control of the registration displacement will be described later.

Registration roller pair 53a is separated after the correction of the position of sheet S in the width direction, before sheet S finishes passing through registration roller pair 53a, that is, in the middle of the conveyance of sheet S, and is returned to the position before the movement. Registration roller pair 53a is pressed and attached again after the rear-end of sheet S passes through registration roller pair 53a.

Under the control of control unit 100, the conveyance speed of sheet S at registration roller pair 53a is set faster than the conveyance speed of sheet S at the secondary transfer nip formed by backup roller 423B and secondary transfer roller 424.

Line sensor 54 is disposed on the downstream of registration roller pair 53a and the upstream of the secondary transfer nip in the sheet conveyance direction. Line sensor 54 is a sensor including linearly disposed photoelectric conversion elements, and line sensor 54 plays a role of detecting an offset of sheet S in the width direction, that is, a deviation from a reference position.

Sheets S housed in sheet feed tray units 51a to 51c are sent out piece by piece from the top and are conveyed by conveyance path unit 53 to image forming section 40. In this case, registration roller pair 53a corrects the inclination of the fed sheet S and adjusts the conveyance timing.

In image forming section 40, the toner images of intermediate transfer belt 421 are secondarily transferred altogether to one of the surfaces of sheet S, and a fixing process is applied by fixing unit 60. Sheet ejection unit 52 including sheet ejection roller 52a ejects sheet S provided with the images to the outside of the apparatus. Note that during double-sided printing, sheet S after the image formation on a first surface passes through the double-sided conveyance path, and the front and the back are inverted. The toner images are secondarily transferred and fixed to a second surface, and sheet ejection unit 52 ejects sheet S to the outside of the apparatus.

By the way, the image forming apparatus has a problem of a phenomenon that the conveyance direction of the sheet is passed obliquely in the sub scanning direction (sub scanning obliqueness) due to misalignment from the registration roller to the fixing nip through the secondary transfer nip. In addition to the misalignment, the sub scanning obliqueness is also likely to occur when there is a difference between the diameters at opposite ends of the rollers in the sheet width direction (sub scanning direction) due to a durability issue or the like. The long sheet with a long size in the conveyance direction is easily affected, and the sub scanning obliqueness often occurs (see FIG. 3A). The sub scanning obliqueness leads to a poor image due to deviation or distortion of the image transferred at the transfer section, and a technique of reducing the sub scanning obliqueness is demanded.

To counter the problem, a read value of line sensor 54 is conventionally used, that is, the width direction edge position of the sheet detected by the sensor is monitored, to displace registration roller pair 53a, and control of correcting the sub scanning obliqueness is performed in real time. The conventional registration displacement control will be described with reference to FIGS. 3A and 3B.

Figure 3A:
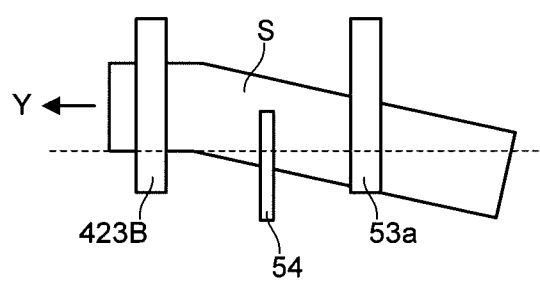
FIGS. 3A and 3B are diagrams describing conventional control of registration displacement when a long sheet is conveyed, FIG. 3A showing a state before movement of a registration roller pair, FIG. 3B showing a state after the movement of the registration roller pair.
Figure 3B:
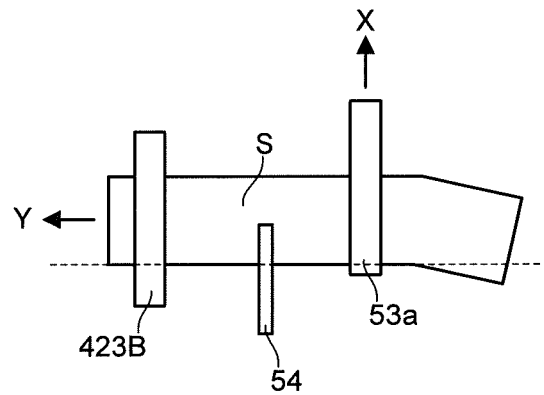

FIGS. 3A and 3B are diagrams describing the conventional control of registration displacement when conveyed sheet S is a long sheet. Arrow Y denotes the conveyance direction of the sheet. A dotted line denotes the position of a reference end of the sheet detected by line sensor 54. Arrow X denotes the displacement direction of registration roller pair 53a.

FIG. 3A illustrates an example in which the rear-end side of sheet S is passed obliquely to the left side after the front-end of sheet S (long sheet) is thrusted into backup roller 423B forming the transfer nip. In this case, control unit 100 detects the direction and the amount of the obliqueness of sheet S from an output signal of line sensor 54 and calculates the direction and the amount of the displacement of registration roller pair 53a from the detection result. As shown in FIG. 3B, control unit 100 then performs control of displacing registration roller pair 53a in direction X orthogonal to sheet conveyance direction Y according to the calculation values.

According to the conventional registration displacement control, the longer the length of sheet S in the conveyance direction is, the more the displacement operation of registration roller pair 53a needs to be repeatedly performed after sheet S is thrusted into the secondary transfer nip (see FIG. 3B). Therefore, there is a problem that the irradiation time of line sensor 54 increases, and the life of line sensor 54 is reduced.

Due to the structure of the apparatus, the disposition of line sensor 54, that is, the position in the conveyance direction, cannot be brought into line with the disposition of the constituent members of the secondary transfer nip, and line sensor 54 is disposed on the upstream of the secondary transfer nip in the conveyance direction. Therefore, when, for example, there are variations in the external form of the side edge of sheet S, the image position may be displaced in the width direction with respect to the sheet position in the actual transfer of the image to the sheet in the conventional registration displacement control, even when line sensor 54 detects that the edge of sheet S is at the right position.

In this way, complete correction of the sub scanning obliqueness is difficult in the conventional technique of always using the detection results of line sensor 54 to perform the operation of registration displacement, and as a result, a poor image may be generated by the transfer nip. When the image is formed on a long sheet with a length greater than A3 size, the overall amount of conveyance is large, and the poor image is often generated.

Although the obliquity manner or the amount of obliqueness of the sub scanning obliqueness varies as described above due to individual differences between machines, such as the alignment and the difference between the depths of the rollers, the obliquity manner or the amount of obliqueness is not significantly changed after image forming apparatus 1 is installed in a room or the like, and the obliquity manner or the amount of obliqueness is constant in each machine. The present inventors have conducted various experiments based on the knowledge and found out that line sensor 54 does not have to perform the detection at all times in order to correct the sub scanning obliqueness, and a sufficient advantageous effect can be obtained by displacing registration roller pair 53a based on predetermined fixed values (preset values).

Therefore, control unit 100 in the present Embodiment does not use the value detected by line sensor 54 and controls the registration displacement by using preset values defining displacement conditions of registration roller pair 53a for providing a correct position of the image on sheet S. More specifically, control unit 100 uses the preset values to control registration roller pair 53a to displace sheet S in the width direction orthogonal to the sheet conveyance direction.

Here, the preset values are values for setting details of the displacement operation of registration roller pair 53a after sheet S is thrusted into the nip (registration nip) by registration roller pair 53a, until sheet S comes out of the registration nip.

Therefore, the preset values can define the displacement conditions of registration roller pair 53a in one or both of a state before the front-end of sheet S in the conveyance direction reaches the secondary transfer nip and a state after sheet S is thrusted into the secondary transfer nip.

The preset values also include a value indicating the amount of movement of registration roller pair 53a in the sheet width direction. The value is indicated based on the direction of movement, such as a positive value for movement to the right and a negative value for movement to the left.

Here, when sheet S is a long sheet, the sheet rear-end may remain in the sheet feeding unit (such as manual sheet feed tray) even after the sheet front-end is thrusted into the secondary transfer nip. In that case, there is a problem that the sheet tends to skew due to misalignment of conveyance path unit 53. Therefore, the displacement operation after sheet S is thrusted into the secondary transfer nip is important in the registration displacement control for the long sheet.

In such a case, the preset values in the present Embodiment can define details of operation (displacement conditions) of registration roller pair 53a after the front-end of sheet S is thrusted into the secondary transfer nip. In this case, the displacement operation of registration roller pair 53a after the sheet front-end is thrusted into the secondary transfer nip can be carried out based on fixed values. This can correct the amount of deviation in the sheet conveyance direction and correct the shape of the long sheet in the length direction to thereby linearly convey the long sheet.

The preset values also include a value indicating the timing (displacement timing) of moving registration roller pair 53a in the sheet width direction after the start of the thrust of sheet S into the transfer nip. A plurality of displacement timings can be set for one piece of sheet S. Intervals between the timings can be arbitrarily set when a plurality of displacement timings are set for one piece of sheet S. Here, the displacement timing is a value indicating a period (time) of the movement of registration roller pair 53a in the width direction, i.e. a value indicating the distance of sheet S conveyed by the transfer nip when registration roller pair 53a moves in the width direction.

The preset values also include a value indicating the amount of movement of registration roller pair 53a in the sheet width direction at each displacement timing. Here, the displacement timing will be referred to as a displacement point for the convenience. According to the preset values, N (N=1 or more) displacement points (positions in direction Y in FIGS. 3A and 3B) for displacing registration roller pair 53a after sheet S is thrusted into the transfer nip are set, and the direction of movement and the amount of movement are defined for each displacement point.

More specifically, the preset values define the amounts of movement of registration roller pair 53a in the sheet width direction (direction X) at each displacement point (conveyance distance in direction Y) after sheet S is thrusted into the transfer nip. Overall, the preset values include values defining the amounts of movement of registration roller pair 53a in the sheet width direction, throughout the entire length of sheet S in the conveyance direction.

In the present Embodiment, the preset values can be configured in this way to change the amount of movement of registration roller pair 53a at each displacement point, and the amount of movement of registration roller pair 53a can be changed between the front-end side and the rear-end side of sheet S.

In general, with an increase in the length of sheet S in the conveyance direction, the influence of the alignment of each unit of image forming apparatus 1 increases, and the displacement on the rear-end side increases. In such a case, the amount of movement of registration roller pair 53a can be relatively small (for example, 1 mm) at a displacement point on the front-end side of sheet S, and the amount of movement of registration roller pair 53a can be relatively large (for example, 3 mm) at a displacement point on the rear-end side of sheet S. The preset values can be set in this way to realize linear paper feeding.

The preset values can further include values indicating the movement speed of the movement of registration roller pair 53a at each displacement point. The values of the movement speed can indicate a constant speed or can indicate an addition-subtraction speed.

In this way, the preset values (fixed values) include various values indicating the displacement conditions of registration roller pair 53*a* in the present Embodiment. As described later, appropriate displacement conditions of registration roller pair 53*a* vary depending on image forming conditions such as the type of sheet S. In view of the circumstances, it is preferable to register the preset values in one or a plurality of tables, and control unit 100 appropriately reads the values registered in the tables to control the registration displacement. The configuration of the tables for registering the preset values will be further described later.

Hereinafter, an outline of the registration displacement control of the present Embodiment will be described with reference to a flow diagram of FIG. 4.

Figure 4:
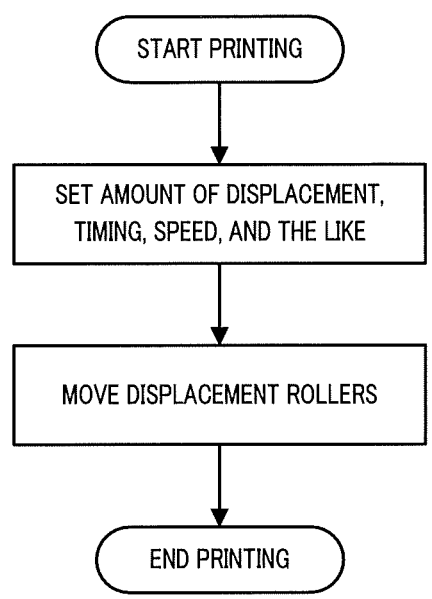
FIG. 4 is a diagram describing an outline of registration displacement control according to the present Embodiment.

As shown in FIG. 4, control unit 100 reads the preset values, that is, the predetermined fixed values, to set the details of operation (such as amount of movement, timing, and speed) of registration roller pair 53*a* (hereinafter, also referred to as "displacement rollers") at the start of a print job in the registration displacement control of the present Embodiment. The reading of the fixed values and the setting of the details of operation can be performed at any period before sheet S is thrusted into the displacement rollers. After sheet S is thrusted into the displacement rollers, control unit 100 controls the displacement rollers to move in the width direction orthogonal to the conveyance direction of sheet S based on the set details.

Next, details of control of the present Embodiment when the registration displacement is performed for a plurality of times for one piece of long sheet will be described with reference to a flow diagram of FIG. 5.

Figure 5:
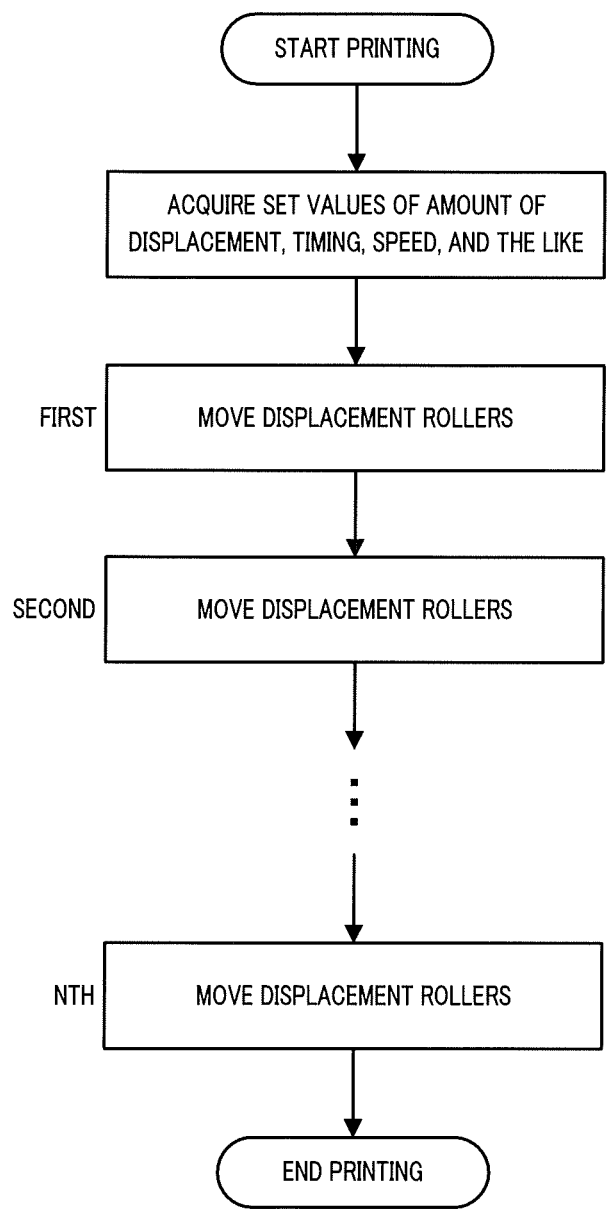
FIG. 5 is a diagram describing control performed when registration displacement is performed for a plurality of times for one piece of long sheet.

As shown in FIG. 5, control unit 100 reads the preset values, that is, the predetermined fixed values, to set the amounts of displacement, the timings of displacement, the speeds of displacement, and the like of the displacement rollers for a plurality of times (N times) when the print job is started in the registration displacement control of the present Embodiment. The reading of the fixed values and the setting of the displacement operation can be performed at any period before the thrust of the long sheet into the displacement rollers in the first displacement and can be performed at any period before the start of the displacement control in the second to Nth displacements. Once the long sheet is thrusted into the displacement rollers, control unit 100 controls the displacement rollers to move in the width direction orthogonal to the conveyance direction of sheet S based on the details set for the first displacement and also controls the displacement rollers to move in the width direction orthogonal to the conveyance direction of sheet S based on the details set for each of the second to Nth displacements.

In this way, according to the present Embodiment in which the preset values are used to perform the registration displacement, the displacement conditions of the displacement rollers (registration roller pair 53*a*) are set in advance, and the displacement rollers are controlled and moved by intended amounts at intended points. According to the present Embodiment in which the registration displacement control is performed, the sub scanning obliqueness of sheet S caused by misalignment or the like can be corrected without depending on the detection result of line sensor 54.

According to the present Embodiment, the registration displacement can be performed without using line sensor 54, and the problem of the life of line sensor 54 can be solved.

According to the present Embodiment, the preset values are set such that the image at the transfer is in line with sheet S, and the image can be at a desired position of sheet S in the width direction.

According to the present Embodiment, line sensor 54 does not have to detect the side edge of sheet S, unlike in the conventional registration displacement control. Sheet S can be displaced after sheet S is thrusted into registration roller pair 53*a*, before the front-end of sheet S passes through line sensor 54. Therefore, the range of the conditions for displacing sheet S is increased according to the present Embodiment.

Furthermore, the same surface sections of sheets S are set at the reference position (see dotted line of FIGS. 3A and 3B) even in the execution of the double-sided printing job, and the influence of differences in individual sheets S, such as variations in external form, obliquity, and twists, can be reduced in image forming apparatus 1 of the present Embodiment.

Hereinafter, the table for registering the preset values will be described in more detail.

As described, the preset values define the displacement conditions of registration roller pair 53*a*, that is, the details of operation such as the amount, the timing, and the speed of displacement, to bring the position of sheet S in the width direction into line with the image transferred by the transfer nip.

On the other hand, preferable details of operation of registration roller pair 53*a* for bringing the position of sheet S in the width direction into line with the image transferred by the transfer nip may vary depending on the type of sheet S (such as length, width, glossiness of surface, and basis weight (stiffness)).

For example, in general, the longer the length of sheet S in the conveyance direction is, the larger the number of times (number of N described in FIG. 5) of the displacement of registration roller pair 53*a* needs to be. When the difference between the depths of the diameters of the rollers is large, the influence of the difference between the diameters may increase with an increase in the width of sheet S. Furthermore, the slipperiness in the conveyance of sheet S placed between the pair of rollers varies between sheet S with a high glossiness and sheet S with a low glossiness (the former is more slippery). Therefore, it may be necessary to change the amount, the speed, and the like of displacement even for the sheets of the same size. The same applies when the basis weight (stiffness) of sheet S varies, and the problem will be described later.

Therefore, the table has a table structure for registering the preset values for each type of sheet S (such as length, width, glossiness of surface, and basis weight). In this case, at the execution of the print job, control unit 100 specifies the type of sheet S to be conveyed from user setting information defining the types of sheet S and sheet feed tray units (51*a* to 51*c*) to be used. Control unit 100 reads the preset values corresponding to the specified type of sheet S from the table and controls the registration displacement.

There are various types of sheet S as described above, and the table for registering the preset values can be provided according to the paper type, that is, for each type of sheet S. In this case, at the execution of the print job, control unit 100 specifies the type of sheet S to be conveyed from the user setting information and reads the preset values registered in the table corresponding to the specified type of sheet S to control the registration displacement.

As described above, different types of sheet S are housed in different sheet feed tray units 51*a* to 51*c*, and sheet S is fed from the manual sheet feed tray when sheet S is a long sheet. Therefore, the preset values may be registered for each sheet feed tray in the table. Similarly, the table for registering the preset values can be provided for each sheet feed tray.

In this case, at the execution of the print job, control unit 100 specifies the sheet feed tray to be used from the user setting information and reads the preset values corresponding to the specified sheet feed tray from the corresponding table to control the registration displacement.

The conditions of the actual positional deviation of image (such as amount of deviation and direction of deviation) may be different even in the same type of sheet S when the installation environment, typically, temperature and humidity conditions, of image forming apparatus 1 is different. In other words, preferable details of operation of registration roller pair 53*a* for bringing the position of sheet S in the width direction into line with the image transferred by the transfer nip may vary depending on the temperature and the humidity. Therefore, the preset values may be registered in the table according to the temperature and the humidity around image forming apparatus 1. Similarly, the table for registering the preset values can be provided according to the temperature and the humidity around image forming apparatus 1, such as for each numerical range of the temperature and the humidity.

In this case, at the execution of the print job, control unit 100 specifies the temperature and the humidity from detection values of a temperature and humidity sensor in the apparatus not shown and reads the preset values corresponding to the specified temperature and humidity from the table to control the registration displacement.

The conditions of the actual positional deviation of image (such as amount of deviation and direction of deviation) may vary between sheet S with blank surfaces on both sides (that is, when the image is to be formed on the front surface of sheet S) and sheet S with one surface already provided with the image (that is, when the image is to be formed on the back surface of sheet S) even in the same type of sheet S. In other words, the preferable details. into line with the image transferred by the transfer nip may vary between a first surface (front surface) and a second surface (back surface) of sheet S.

Therefore, the table may have a table configuration for registering the preset values for the front surface and the back surface of sheet S. The table for registering the preset values may also be provided according to the front surface and the back surface of sheet S, that is, for each of the front surface and the back surface of sheet S.

In this case, at the execution of the double-sided printing job, control unit 100 reads the preset values for the front surface from the corresponding table to control the registration displacement in the printing of the front surface of sheet S. Control unit 100 also reads the preset values for the back surface from the corresponding table to control the registration displacement in the printing of the back surface of sheet S.

The conditions of the actual positional deviation of image (such as amount of deviation and direction of deviation) may vary between the case with a high coverage and the case with a low coverage even in the same type of sheet S. In other words, the preferable details of operation of registration roller pair 53*a* for bringing the position of sheet S in the width direction into line with the image transferred by the transfer nip may vary depending on the coverage, that is, the coverage rate of the image formed on sheet S.

Therefore, the preset values may be registered in the table according to the coverage of the image formed on sheet S. Similarly, the table for registering the preset values may be provided according to the coverage of the image formed on sheet S, such as for each numerical range of the coverage. For example, a table for registering different preset values is provided for the coverage in increments of 20%, that is, for a coverage of 100% to 80%, a coverage of 79% to 60%, a coverage of 59% to 40%, a coverage of 39% to 20%, and a coverage of 19% to 0%. Similarly, the table for registering the preset values can be provided for each numerical range of the coverage. The numerical ranges of the coverage can be various other ranges.

In this case, at the execution of the print job, control unit 100 specifies the coverage for each sheet S from the input image data and reads the preset values corresponding to the specified coverage from the corresponding table to control the registration displacement.

Furthermore, the states, such as the difference between the depths of the diameters or the width directions of various rollers that convey sheet S and the wear of intermediate transfer belt 421, vary depending on the durability of members, more specifically, the sheet conveyance distance, the number of times used, the operating time, and the like, even if the other conditions are the same. Therefore, the conditions of the actual positional deviation of image (such as amount of difference and direction of deviation) may vary between a state in which the members are brand new and a state in which the members are worn. In other words, the preferable details of operation of registration roller pair 53*a* for bringing the position of sheet S in the width direction into line with the image transferred by the transfer nip may vary depending on the use state of registration roller pair 53*a* and the like.

Therefore, control unit 100 records the sheet conveyance distance, the number of times used, the operating time, and the like of registration roller pair 53*a* as use history information in storage unit 72 or the like. Control unit 100 executes an update process of the preset values according to the use history of registration roller pair 53*a*.

In the update process, an inspection mode as described below is executed, or a display for prompting the manager or the like to update the preset values is indicated when the sheet conveyance distance of registration roller pair 53*a* exceeds a predetermined threshold, for example.

For example, in the control of the inspection mode, control unit 100 controls image forming section 40 to transfer a toner image for inspection to intermediate transfer belt 421 and turns on line sensor 54 to feed sheet S through the secondary transfer nip when the sheet conveyance distance exceeds a predetermined threshold. Control unit 100 uses the preset values to displace registration roller pair 53*a* when sheet S is fed through the secondary transfer nip.

In this case, control unit 100 uses detection values of edges of sheet S detected by line sensor 54 to detect the amount of deviation between the position of sheet S in the width direction and the width direction position of the image transferred by the transfer nip for a case in which the preset values are used to perform the registration displacement. Control unit 100 then rewrites the preset values to minimize the detected amount of deviation. For checking or testing, control unit 100 transfers the toner image for inspection to intermediate transfer belt 421 again and turns on line sensor 54 to feed sheet S through the secondary transfer nip. Control unit 100 uses new preset values to control and displace registration roller pair 53*a* when sheet S is fed through the secondary transfer nip.

By performing the control, the preset values can be automatically rewritten according to the change over time.

As described above, the preset values need to be rewritten due to the durability issue, and fine adjustment or the like of the preset values may also be necessary due to various other individual conditions. For example, even when the table for registering the preset values is provided for each paper type as described above, that is, even when different preset values can be applied for each paper type, the conditions of the sub scanning obliqueness may vary if the brand of used sheet S is different.

Therefore, it is desirable that the preset values be arbitrarily rewritten by a user, a manager, a serviceman, or the like (hereinafter, referred to as user or the like). Thus, control unit 100 displays, on display unit 21 of operation display unit 20, a preset value change setting screen (not shown) for changing and setting the preset values through operation unit 22 and controls and updates the preset values according to the input of operation unit 22. The various tables for registering the preset values can be selected on the preset value change setting screen, and the preset values can be changed and set for each table. Alternatively or additionally, control unit 100 may display the preset value change setting screen on a display unit of an external apparatus, such as a PC, and may control and update the preset values according to the input of an operation input unit of the external apparatus.

By performing the control, the user or the like can change and set the preset values on an operation panel or the like at any period.

The user or the like may need a skill to accurately set and change the value of the movement speed of registration roller pair 53*a* moved in the width direction among the elements of the preset values. Therefore, the set value of the movement speed may be maintained at a default value or may be blank.

On the other hand, if registration roller pair 53*a* is displaced after sheet S is thrusted into the secondary transfer nip, a loop that warps sheet S may be generated between registration roller pair 53*a* and the secondary transfer nip, and the image transferred by the transfer nip may be deviated. Particularly, the image is easily deviated due to the generation of the loop when sheet S is thick paper with a high basis weight, that is, a high stiffness. In such a case, the deviation of the image transferred by the transfer nip can be prevented by reducing the displacement speed of registration roller pair 53*a* in many cases.

In view of the circumstances, it is desirable that control unit 100 control and change the displacement speed of registration roller pair 53*a* according to the type of sheet S, particularly, the basis weight (stiffness). Therefore, a table for defining the displacement speed of registration roller pair 53*a* among the preset values may be independently provided, and the displacement speed of registration roller pair 53*a* corresponding to the type of sheet S, particularly, the basis weight (stiffness), may be registered in the table.

Control unit 100 can also control an automatic adjustment mode as described below to automatically set (generate) or correct (update) the table for registering the preset values.

Here, control unit 100 turns on line sensor 54 and feeds a predetermined number of (for example, twenty) same type of sheets S to the transfer nip and fixing unit 60 in the automatic adjustment mode. In this case, control unit 100 controls the components to feed each sheet S in a blank state with a coverage of 0% or to form a toner image for inspection, for example.

When there is no table for registering the preset values corresponding to the image forming conditions (such as the type of sheet S), control unit 100 records detection results of line sensor 54 regarding the feeding of the predetermined number of (twenty) sheets S (that is, amounts of deviation of fed sheets S from the reference position of the edge in the width direction) without controlling the registration displacement. Control unit 100 then sets a table for registering the preset values (such as displacement points and amounts of displacement) corresponding to sheets S according to the detection results of line sensor 54.

On the other hand, when there is a table for registering the preset values corresponding to the type or the like of sheet S, control unit 100 controls the registration displacement according to the preset values and records the detection results of line sensor 54 regarding the feeding of the predetermined number of (twenty) sheets S. Control unit 100 then corrects the preset values (such as displacement points and amounts of displacement) of the table corresponding to sheets S according to the detection results of line sensor 54.

The automatic adjustment control can correct variations in the assembly process of image forming apparatus 1 or variations in the machine inspection performed in adjustment work by the serviceman after the delivery of image forming apparatus 1 or can correct specific habits or the like of each device.

In each configuration example described above, the preset values are separately registered according to the image forming conditions, and the registered preset values are corrected, that is, updated. For another configuration example, control unit 100 may change and add an offset or the like to the preset values according to the image forming conditions and use the preset values.

For example, control unit 100 determines the preset values defining basic displacement conditions (details of operation) of registration roller pair 53*a* from the state of image forming apparatus 1 (such as state of various members that convey sheet S). Control unit 100 then adds or multiplies the determined preset values to or by an offset value or a correction coefficient (ratio) according to the image forming conditions, such as the coverage, the type of sheet S, and the temperature and humidity conditions, to change the preset values and use the changed preset values to control the registration displacement.

Figure 6:
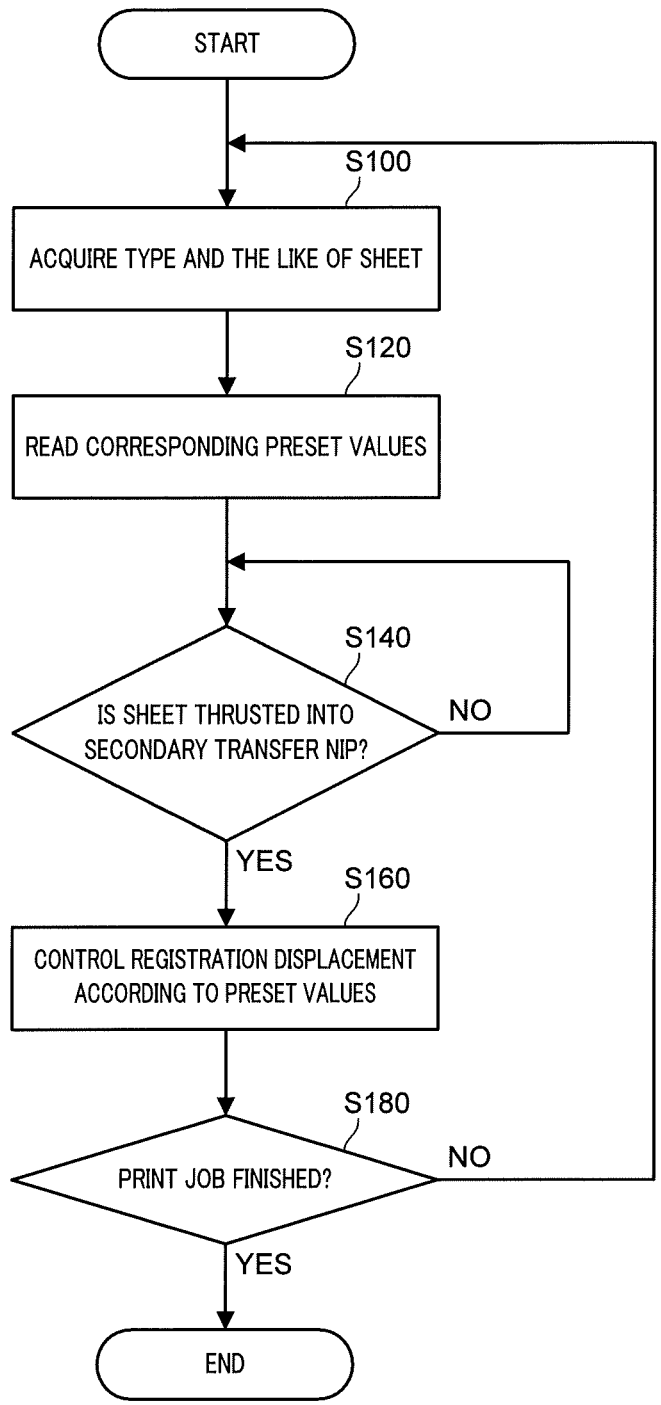
FIG. 6 is a flow chart showing an example of conveyance control related to the registration displacement in the image forming apparatus according to the present Embodiment.

Hereinafter, an example of operation related to the displacement control of registration roller pair 53*a* and sheet S in image forming apparatus 1 will be described. FIG. 6 is a flow chart showing an example of operation of the displacement control in image forming apparatus 1. The process shown in FIG. 6 is an example of the control performed when sheets S are long sheets, and the process is executed for each piece of sheets S to be provided with images in the execution of a print job.

At the execution of the print job, control unit 100 acquires information of the type (such as length, width, glossiness of surface, and basis weight (stiffness)) of sheets S to be printed from the user setting information of the print job (step S100). Here, control unit 100 may additionally acquire information of other image forming conditions such as the coverage.

In step S120, control unit 100 reads the preset values registered in the table corresponding to the acquired image forming conditions (type of sheet in this example) and sets the values related to the displacement operation (displacement conditions) of registration roller pair 53*a*.

Control unit 100 then waits until sheet S is thrusted into the secondary transfer nip (step S140, NO) and moves to step S160 once sheet S is thrusted into the secondary transfer nip (step S140, YES).

In step S160, control unit 100 controls the displacement of registration roller pair 53a according to the set values, that is, the preset values. As a result of the control, registration roller pair 53a is displaced relative to sheet S thrusted into the secondary transfer nip, based on the amount of movement in the width direction, the timing, the speed, the number of times, and the like of the preset values. Sheet S is displaced in the width direction along with the displacement.

Next, control unit 100 determines whether the print job is finished (step S180). As a result of the determination, if the print job is not finished (step S180, NO), control unit 100 returns to step S100. Control unit 100 controls the displacement of registration roller pair 53a and executes the printing process, such as image formation, for next sheet S. On the other hand, if the print job is finished (step S180, YES), control unit 100 ends the series of processes.

In this way, according to the present Embodiment, the sub scanning obliqueness of sheet S caused by the misalignment, the difference between the diameters of the rollers in the width direction, or the like can be corrected, and the generation of the deviation of image or the like caused by the sub scanning direction obliqueness can be prevented. According to the present Embodiment, line sensor 54 does not have to detect the side edge of sheet S unlike in the conventional registration displacement control, and the problem of the life of line sensor 54 can be solved.

(Embodiment 2)

Next, Embodiment 2 of image forming apparatus 1 will be described. Parts different from Embodiment 1 will be mainly described here.

As described above, the registration displacement using the fixed values is based on the premise that the sub scanning obliqueness of sheet S is basically constant. On the other hand, there may be some conveyance variations in the actual sheet conveyance, and the registration displacement control using only the fixed values may not be able to easily handle the conveyance variations.

Therefore, control unit 100 in the present Embodiment controls the registration displacement by using the preset values defining the displacement conditions (details of operation) of registration roller pair 53a and also executes a process of correcting the preset values at a predetermined timing according to the image forming conditions. Line sensor 54 detects the position of the side edge of sheet S, that is, amount of positional deviation, during the control of the registration displacement using the preset values for sheet S, and the correction process of the preset values is executed based on the detected amount of positional deviation.

In the present Embodiment, line sensor 54 measures the positional deviation of the side edge of sheet S at a predetermined timing according to the image forming conditions during the control of the registration displacement using the preset values, and control unit 100 reflects the measurement result on printing of subsequent sheet S.

Therefore, based on the measurement result of line sensor 54, control unit 100 inspects whether sheet S is actually linearly conveyed in the registration displacement control using the preset values, and as a result of the inspection, control unit 100 corrects the preset values and applies (feeds back) the preset values to the printing of subsequent sheet S if the measurement result is significantly deviated from an intended value.

The processing, such as measurement and correction, of the positional deviation is executed at a predetermined timing according to the image forming conditions, and the user can arbitrarily set the timing and the conditions of the execution. In general, it is desirable to set the execution timing of the measurement, the correction, and the like of the positional deviation at a frequency (intervals) in consideration of the reliability of the preset values, the life of line sensor 54, and the like.

In a specific example, when registration roller pair 53a is displaced at a plurality of displacement points along the conveyance direction of sheet S, control unit 100 corrects the preset values by correcting the amount of displacement of registration roller pair 53a at each displacement point (see "first measurement method" described later).

Alternatively, when registration roller pair 53a is displaced at N (N is plural) displacement points along the conveyance direction of sheet S, control unit 100 corrects the preset values for subsequent sheet S according to an inclination of sheet S based on detection results of line sensor 54 at an (N−1)th displacement point and an Nth displacement point (see "second measurement method" described later).

Alternatively, when registration roller pair 53a is displaced at N (N is plural) displacement points along the conveyance direction of sheet S, control unit 100 corrects the preset values by correcting the amount of displacement of registration roller pair 53a at a preset mth (m≤N) displacement point for subsequent sheet based on the detection result of line sensor 54 before the start of the displacement operation at the mth displacement point (see "third measurement method" described later).

Alternatively, when registration roller pair 53a is displaced at N (N is plural) displacement points along the conveyance direction of sheet S, control unit 100 corrects the preset values by correcting the amount of displacement of the sheet conveyance member at a preset mth (m≤N) displacement point for subsequent sheet based on the detection result of line sensor 54 after the start of the displacement operation at the mth displacement point (see "fourth measurement method" described later).

Control unit 100 saves the correction values applied to the preset values or the corrected preset values in a memory or the like for use in a subsequent print job.

Hereinafter, various methods of measuring the positional deviation of the side edge of sheet S by line sensor 54 will be described.

(First Measurement Method)

In the first measurement, line sensor 54 measures the positional deviation of the side edge throughout the entire length of sheet S in the conveyance direction. In this case, control unit 100 obtains the amount of positional deviation of the side edge of sheet S during the registration displacement from the measurement results of line sensor 54 and determines correction values according to the amount of deviation. When there are a plurality of (N) displacement timings (displacement points of sheet S) defined by the preset values, control unit 100 obtains the amount of positional deviation at each displacement point and determines the correction values. Control unit 100 corrects the preset values to apply the determined correction values to the amount of displacement of registration roller pair 53a.

In the correction, control unit 100 may add the amount of deviation of the side edge of sheet S measured by line sensor 54 to the preset values or may multiply the amount of deviation by a predetermined coefficient and add the value to the preset values.

Control unit 100 may also reflect the correction values based on the amount of deviation on the preset values such that the correction values vary between the front-end side and the rear-end side of sheet S. In general, the longer than length of sheet S in the conveyance direction, the more the influence of the alignment of each unit in image forming apparatus 1. The positional deviation of the side edge on the rear-end side of sheet S becomes large. Therefore, control unit 100 determines the correction values at each displacement point based on the amount of deviation such that the amount of displacement on the rear-end side of sheet S is larger than the amount of displacement on the front-end side. Control unit 100 applies the determined correction values to the preset values. As a result of the process, paper feeding in the image transfer can be more linear.

Generally, the amount of displacement for one displacement point of registration roller pair 53a defined by the corrected preset values may be greater than, smaller than, or equal to the amount of displacement of registration roller pair 53a defined by the preset values before the correction.

Control unit 100 may further correct the preset values to appropriately add displacement timings of registration roller pair 53a, that is, displacement points on sheet S.

On the other hand, control unit 100 does not correct the preset values when there is no deviation of the side edge of sheet S measured by line sensor 54 or when the amount of deviation is significantly small. The user can arbitrarily set a reference value of the amount of deviation for determining whether to correct the preset value.

Line sensor 54 is operated throughout the entire length of sheet S in the conveyance direction in the first measurement, and the operation time of line sensor 54 is longer than in the second and third measurement methods described below.

Therefore, from the viewpoint of putting emphasis on the life of line sensor 54, the frequency (predetermined timing) of the execution of the first measurement can be set to, for example, first sheet S at the start of the print job, first sheet S after the power of image forming apparatus 1 is turned on, or the like. Furthermore, the state of alignment may vary between upper sheets S and lower sheets S of the sheet feed tray, and the first measurement may be executed for every predetermined number of sheets S when a large number of sheets S are printed in the print job. In addition, the first measurement can be executed when the reliability of the preset values may decrease, such as when the temperature and humidity indicated by detection values of a temperature and humidity sensor (not shown) in image forming apparatus 1 are significantly deviated from normal values. The first measurement can also be executed under various situations (image forming conditions) in which the reliability of the preset values may decrease.

(Second Measurement Method)

In the second measurement, line sensor 54 detects the positional deviation of the side edge at two parts of sheet S in the conveyance direction to measure a tilt, that is, an inclination of sheet S.

Specifically, when there are a plurality of (N) displacement points in sheet S, control unit 100 calculates the inclination of sheet S from the amounts of deviation of side edge at an (N−1)th displacement point and an Nth (that is, the last) displacement point among the amounts of deviation of the side edge of sheet S that can be measured by line sensor 54. Control unit 100 then corrects the preset values to reflect the calculation value on the Nth displacement point of subsequent sheet S.

More specifically, control unit 100 turns on line sensor 54 at the timing that the (N−1)th displacement point and the Nth (last) displacement point of sheet S pass through the line sensor 54 and measures the amounts of deviation of the side edge of sheet S at the displacement points of two parts. Control unit 100 then divides a difference between the amounts of deviation at the (N−1)th displacement point and the Nth displacement point by a distance between the (N−1)th and Nth displacement points to calculate a degree of tilt (amount of inclination) of sheet S. Subsequently, control unit 100 corrects the preset values by correcting the amount of displacement at the last (Nth) displacement point for subsequent sheet S based on the calculated amount of inclination of sheet S.

In this way, the operating time of line sensor 54 is relatively short in the process of measuring the positional deviation at the displacement points of two parts of sheet S in the conveyance direction to correct the preset values, and the process can be more frequently executed than the first measurement. The positional deviation of the side edge is likely to occur on the rear-end side of the sheet when, for example, sheets S is a long sheet, and control unit 100 can perform the measurement and the correction for each piece of long sheets.

Furthermore, variations in the conveyance of sheet S may cause an error, such as the amount of displacement is not enough or too much, when the preset values (fixed values) set in advance are used to perform the registration displacement. Particularly, such an error is likely to occur on the rear-end side of a long sheet. In consideration of the possibility of the occurrence of an error, control unit 100 may execute a process of the following third measurement and correction in order to more accurately correct the positional deviation of the side edge of sheet S.

(Third Measurement Method)

In the third measurement, line sensor 54 measures the positional deviation of the side edge at one part of sheet S in the conveyance direction. Specifically, when there are a plurality of (N) displacement points in sheet S, control unit 100 turns on line sensor 54 at a timing just before the displacement operation of registration roller pair 53a at a preset mth (m is equal to or smaller than N) displacement point and measures the positional deviation of the side edge of sheet S. Control unit 100 then corrects the preset values by correcting the amount of displacement at the mth displacement point for subsequent sheet S based on the measured amount of positional deviation. Here, the value of m can be set by selecting a displacement point where an error in the amount of displacement is likely to occur.

(Fourth Measurement Method)

Similarly, line sensor 54 also measures the width direction positional deviation at one part of sheet S in the conveyance direction in the fourth measurement. More specifically, when there are a plurality of (N) displacement points in sheet S, control unit 100 turns on line sensor 54 at a timing just after the displacement operation of registration roller pair 53a at the mth displacement point and measures the positional deviation of the side edge of sheet S. Control unit 100 then corrects the preset values by correcting the amount of displacement at the mth displacement point for subsequent sheet S based on the measured amount of positional deviation.

In the third measurement and the fourth measurement, the amount of positional deviation of sheet S measured by line sensor 54 is not the amount of positional deviation during the displacement operation of registration roller pair 53a. Therefore, when control unit 100 corrects the preset values based on the third measurement or the fourth measurement, control unit 100 can set a correction value by multiplying the amount of positional deviation of sheet S by predetermined coefficient ($\alpha$) and apply the correction value to the amount of displacement at the mth displacement point for subsequent sheet S.

Alternatively, control unit 100 may perform both of the third measurement and the fourth measurement and set an average value of the measured amounts of positional deviation at two parts as a correction value. Control unit 100 may apply the correction value to the amount of displacement at the mth displacement point for subsequent sheet S. Control unit 100 may also perform the second measurement and determine the correction value to be applied to the mth displacement point for subsequent sheet S based on the second, third, and fourth measurement results.

As in the second measurement, the operating time of line sensor 54 can be relatively short in the third measurement and the fourth measurement, and the measurement can be more frequently performed than the first measurement. The positional deviation of the side edge is likely to occur on the rear-end side of the sheet when, for example, sheet S is a long sheet, and control unit 100 can perform the measurement and the correction for each piece of the long sheets.

(Fifth Measurement Method)

Control unit 100 may further perform the following control from the viewpoint of putting emphasis on the life of line sensor 54. More specifically, control unit 100 turns on line sensor 54 at a timing of the displacement of sheet S resulted from the displacement of registration roller pair 53a to measure the amount of deviation of the side edge of sheet S only at the displacement point and determines the correction values of the displacement point (each displacement point when there are a plurality of displacement points) according to the amount of deviation. Control unit 100 corrects the preset values to apply the determined correction values to the amount of displacement of registration roller pair 53a. The other points are the same as in the method of the first measurement.

By performing the control, the operating time of line sensor 54 can be shorter than when the positional deviation is measured throughout the entire area of sheet S in the conveyance direction, and an error or the like of the preset values can be simply inspected and corrected.

Control unit 100 also saves the determined correction values or the corrected preset values (preset values after the application of the correction values) in storage unit 72 to allow using the values at the execution of the next print job or during the printing after the power source is turned off and then turned on again (hereinafter, referred to as subsequent print job). Here, when only the correction values are saved in storage unit 72, the preset values may be corrected, that is, the correction values may be applied to the preset values, at the execution of the subsequent print job.

In this way, the information of the positional deviation of sheet S during the execution of the print job based on the measurement of line sensor 54 can be set as the correction values of the registration displacement control (that is, target values of displacement) and fed back to the preset values to more accurately control the registration displacement based on the preset values.

In the present Embodiment, the preset values can be registered in each table set according to various image forming conditions as in Embodiment 1 described above. Here, examples of the image forming conditions include the type of sheet S, the temperature and the humidity around image forming apparatus 1, the front and back of sheet S in double-sided printing, the sheet feed tray for feeding sheet S, and the coverage of the image formed on sheet S. When the preset values are registered in each table, control unit 100 corrects the preset values corresponding to the table for registering the preset values according to the image forming conditions.

Control unit 100 can automatically rewrite the preset values by, for example, executing the inspection mode described in Embodiment 1. Control unit 100 can also control the automatic adjustment mode as described in Embodiment 1 to automatically set (generate) or correct (update) the table for registering the preset values.

Figure 7:
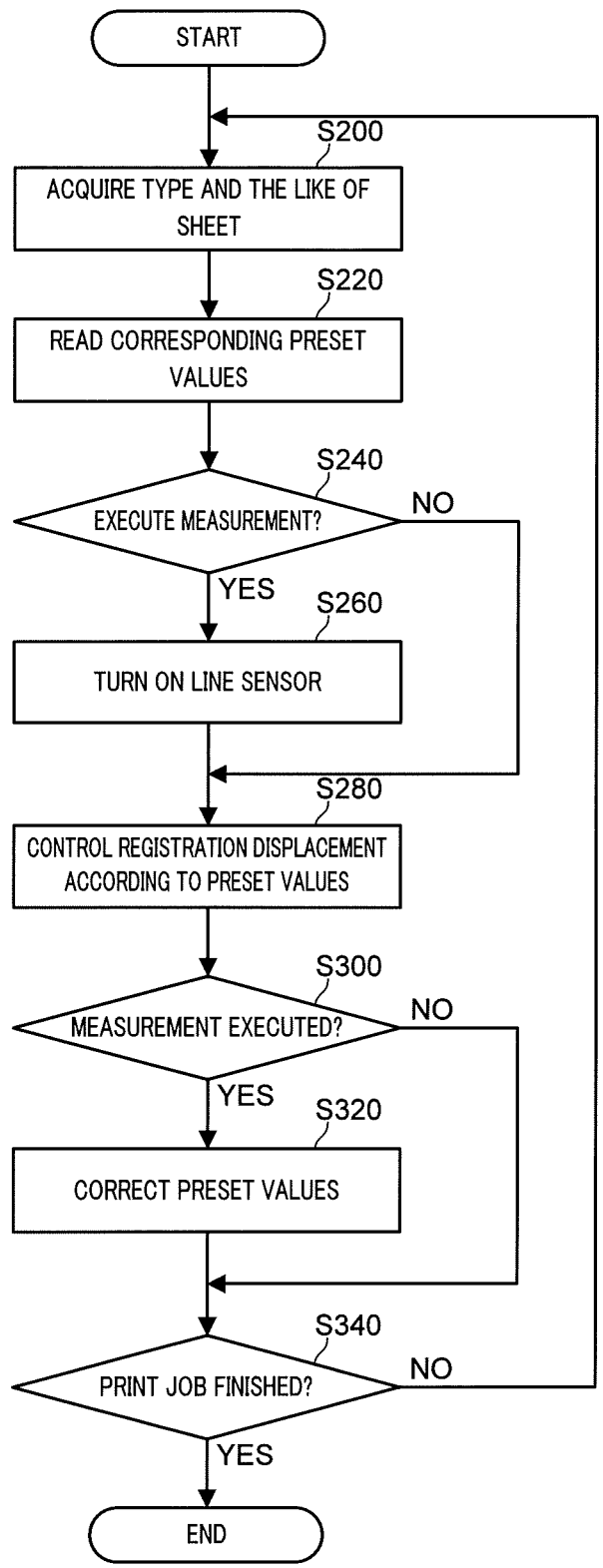
FIG. 7 is a flow chart showing an example of the conveyance control related to the registration displacement of the image forming apparatus according to Embodiment 2.

Next, an example of operation related to the displacement control of registration roller pair 53a and sheet S in Embodiment 2 will be described with reference to a flow chart of FIG. 7. FIG. 7 is a flow chart showing an operation example of the displacement control in image forming apparatus 1. The process shown in FIG. 7 is an example of control performed when sheets S are long sheets, and the process is executed for each piece of sheets S to be provided with images in the execution of a print job. The example illustrates a case in which the details of operation of registration roller pair 53a after the front-end of sheet S (long sheet) is thrusted into the secondary transfer nip are defined as the preset values, and the first measurement is performed.

At the execution of the print job, control unit 100 acquires information of the type (such as length, width, and basis weight (stiffness)) of sheet S to be printed from the user setting information of the print job (step S200). Here, control unit 100 may additionally acquire information of other image forming conditions such as the coverage.

In step S220, control unit 100 reads the preset values registered in the table corresponding to the acquired image forming conditions (type of sheet S in this example) and sets the values related to the displacement operation (displacement conditions) of registration roller pair 53a.

In step S240, control unit 100 determines whether to execute the measurement by line sensor 54 based on whether a predetermined timing set in advance has come. In the example, the predetermined timing is set to first sheet S at the start of the print job.

If the measurement by line sensor 54 is to be executed (step S240, YES), control unit 100 turns on line sensor 54 (step S260) to start to measure the position (positional deviation) of the side edge of sheet S and moves to step S280.

On the other hand, if the measurement by line sensor 54 is not to be executed (step S240, NO), that is, if sheet S to be printed is second or subsequent sheet S of the print job, control unit 100 skips the process to step S280.

In step S280, control unit 100 controls the registration displacement according to the preset values. Specifically, in step S280, control unit 100 executes the displacement control of registration roller pair 53a according to the values set in step S220, that is, the preset values, once the front-end of sheet S is thrusted into the secondary transfer nip. As a result of the control, registration roller pair 53a is displaced with respect to sheet S thrusted into the secondary transfer nip, based on the amount of movement in the width direction, the timing, the speed, the number of times, and the like according to the preset values. Sheet S is displaced in the width direction along with the displacement.

Here, when the measurement by line sensor 54 is executed (step S240, YES), control unit 100 controls the registration displacement according to the preset values while monitoring the output of line sensor 54 and temporarily storing the information of the amount of positional deviation of the side edge of sheet S in a memory (such as RAM 103).

Subsequently, control unit 100 determines whether the measurement by line sensor 54 is executed for sheet S (step S300). If control unit 100 determines that the measurement is executed (step S300, YES), control unit 100 moves to step S320. On the other hand, if control unit 100 determines that the measurement is not executed (step S300, NO), control unit 100 skips the process to step S340.

In step S320, control unit 100 obtains the amount of deviation from the reference position (see dotted line in FIGS. 3A and 3B) at each displacement timing (displacement point) of the displacement according to the preset values based on the measurement results of line sensor 54 and determines the correction values according to the amount of deviation. Control unit 100 then applies the determined correction values to the preset values and saves the preset values in a memory (storage unit 72) to update the table for registering the preset values. As a result of the process, the preset values and the table for registering the preset values are rewritten to correct (update) the amount of displacement of registration roller pair 53a after the front-end of sheet S is thrusted into the secondary transfer nip.

Next, control unit 100 determines whether the print job is finished (step S340). If the print job is not finished as a result of the determination (step S340, NO), control unit 100 returns to step S200 to control the displacement of registration roller pair 53a and execute the printing process, such as image formation, for next sheet S. Therefore, the preset values registered in the table updated in step S320 are used to control the registration displacement in the displacement control of registration roller pair 53a (step S280) for second and subsequent sheets S of the print job.

Note that in another example, when the second, third, or fourth measurement is to be performed for second and subsequent sheets S (long sheets) of the print job, the processes of steps 5260 and step S320 are executed (YES in each of steps S240 and S300). In this case, the preset values and the table for registering the preset values are updated to update the amount of displacement of registration roller pair 53a at the last (Nth) displacement point for each piece of the long sheets.

On the other hand, if the print job is finished (step S340, YES), control unit 100 ends the series of processes.

According to Embodiment 2 in which the process is executed, the registration displacement based on the preset values (fixed values) can be executed in more detail, and this can realize highly accurate registration displacement control and positional deviation correction of sheet S corresponding to the conveyance variations in the actual sheet conveyance.

Overall, according to this Embodiment, the sub scanning obliqueness of sheet S caused by the misalignment, the difference between the diameters of the rollers in the width direction, or the like can be corrected while the use of line sensor 54 is reduced. Therefore, according to the present Embodiment, the generation of deviation of image or the like caused by the sub scanning direction obliqueness can be prevented.

(Embodiment 3)

Figure 8:
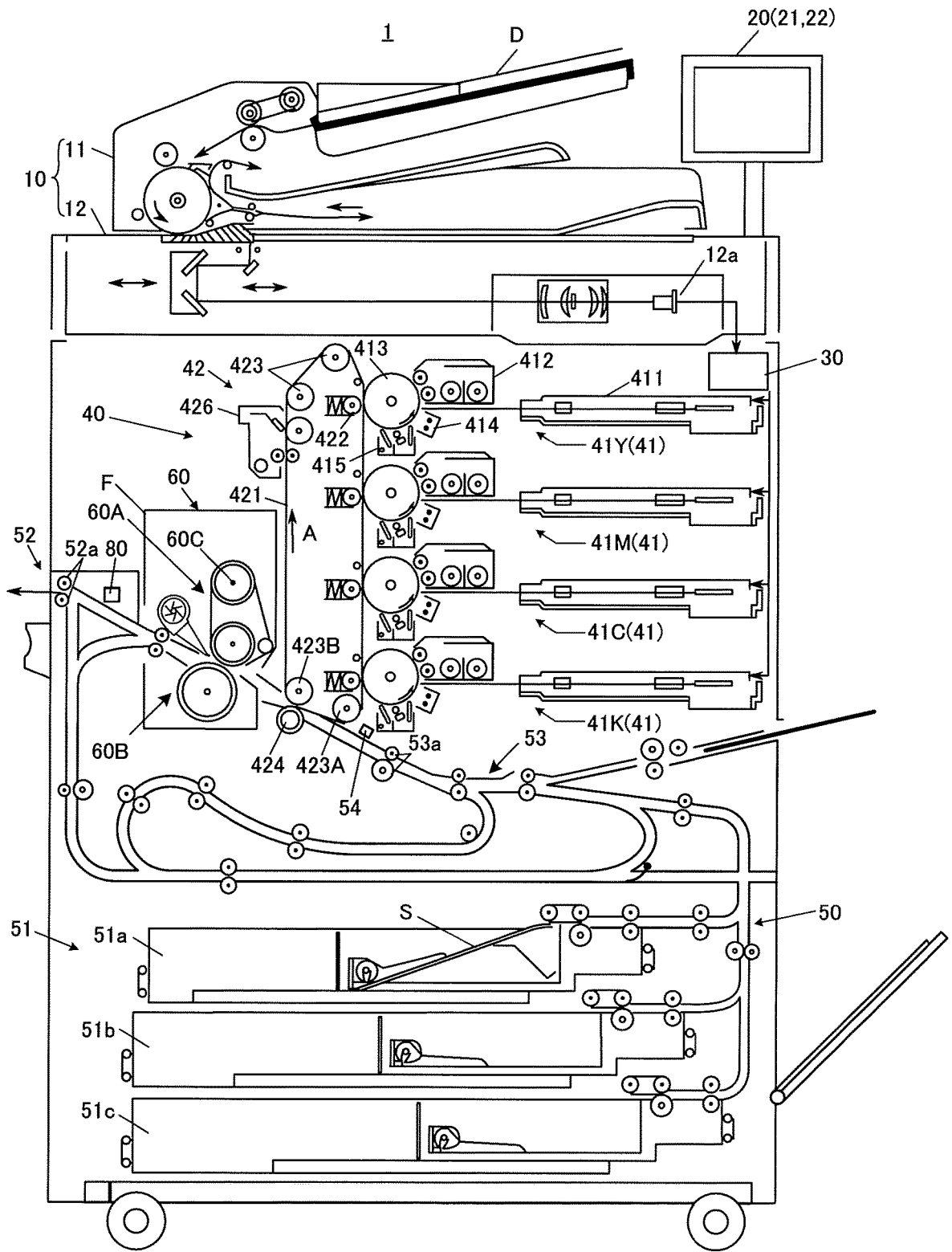
FIG. 8 schematically illustrates an overall configuration of the image forming apparatus according to Embodiment 3.
Figure 9:
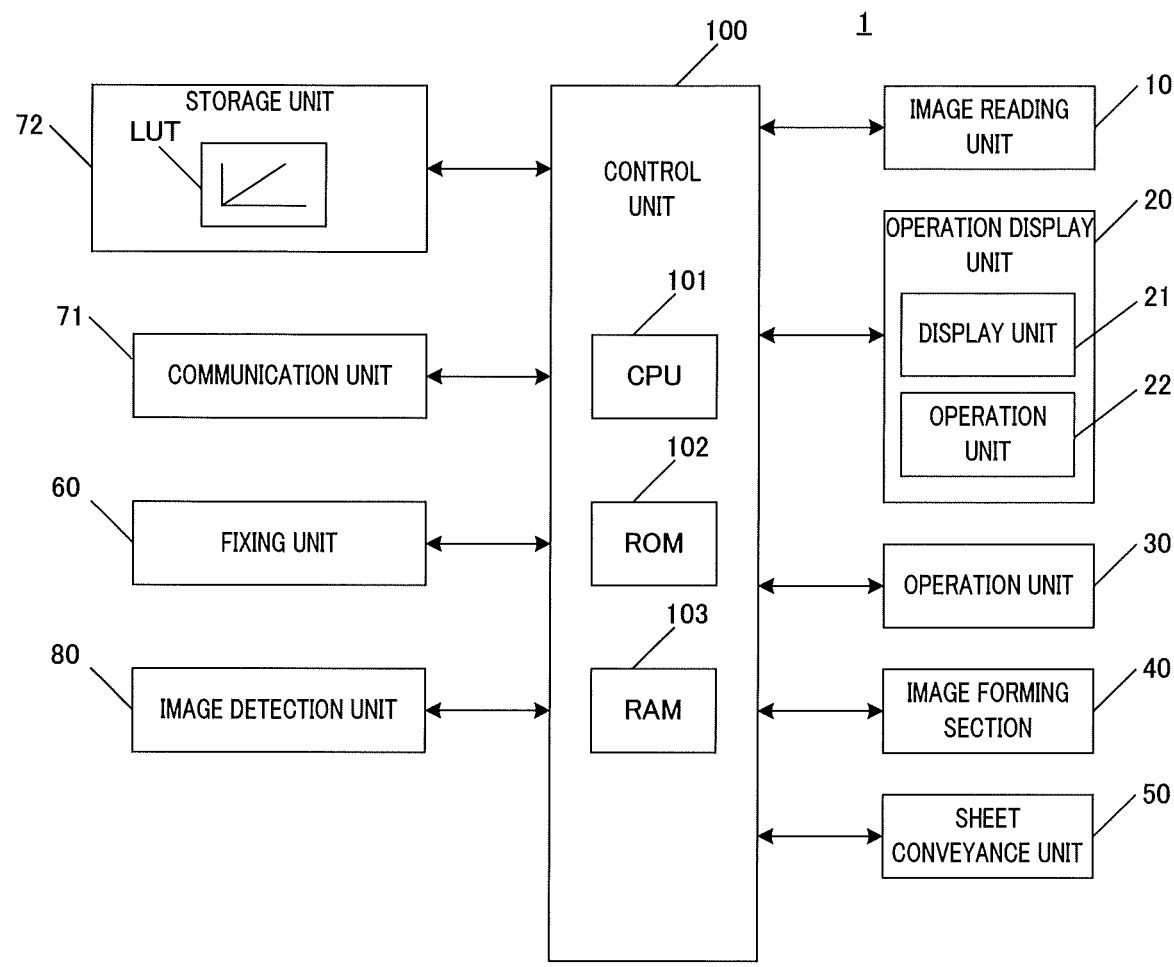
FIG. 9 is a block diagram showing main parts of the control system of the image forming apparatus of FIG. 8.

Next, Embodiment 3 of image forming apparatus 1 will be described. FIG. 8 schematically illustrates an overall configuration of image forming apparatus 1 according to Embodiment 3. FIG. 9 shows main parts of the control system of image forming apparatus 1 according to Embodiment 3. In FIGS. 8 and 9, the same reference signs are provided to the same parts as in Embodiment 1 described above.

As can be recognized by comparing FIGS. 8 and 9 with FIGS. 1 and 2, image detection unit 80 is added in Embodiment 3. Image detection unit 80 includes a well-known image scanner or the like that detects a toner image on a front surface (upper surface) of sheet S. Image detection unit 80 is disposed on the downstream of fixing unit 60 in the conveyance direction of sheet S. Image detection unit 80 corresponds to an "image reading unit" of the present invention. In the present Embodiment, image detection unit 80 plays a role of reading an image formed on sheet S to detect the position of the image on sheet S in order to determine the correction values for correcting the preset values described later.

As described above, the registration displacement using the fixed values is based on the premise that the sub scanning obliqueness of sheet S is basically constant. There are some conveyance variations in the actual sheet conveyance, and there is a limit to more accurate control of the registration displacement.

Consequently, in Embodiment 3, control unit 100 controls the registration displacement by using the preset values defining the displacement conditions (details of operation) of registration roller pair 53a for providing a correct position of the image on sheet S and also executes a process of correcting and updating the preset values based on reading results of image detection unit 80. More specifically, in this Embodiment, image detection unit 80 reads the image on sheet S after the registration displacement based on the fixed values, and the information of the positional deviation of image based on the position of the read image on sheet S is applied to the preset values to correct and update the preset values. Control unit 100 then uses the updated values obtained by correcting the preset values to control the registration displacement for subsequent sheet S.

In the present Embodiment, control unit 100 uses the reading result of image detection unit 80 to obtain an amount of deviation between the intended position in the width direction of the image to be formed on sheet S and the width direction position of the image actually formed on sheet S and determines the correction values according to the amount of deviation. Control unit 100 also calculates the amount of positional deviation of image to determine the correction values for each of the displacement points.

More specifically, control unit 100 obtains values of the positional deviation of images as correction values based on the image forming position of the input image set in the print job and based on the actual position of the image on sheet S read by image detection unit 80 and applies the correction values to the preset values to update the preset values. Control unit 100 then uses the updated preset values in the control of the registration displacement for following sheet S.

Control unit 100 also saves the correction values or the updated preset values in storage unit 72 to allow using the correction values or the updated preset values in a subsequent print job, that is, at the execution of the subsequent print job or after the power is turned off and then turned on again.

In this way, the information of the positional deviation of image obtained based on the reading result of image detection unit 80 is set as the correction values of the registration displacement control (that is, target values of displacement) and fed back to the preset values, and the registration displacement can be more accurately controlled.

In the present Embodiment, the preset values can be registered for each table set according to various image forming conditions as in Embodiment 1 described above. Here, examples of the image forming conditions include the type of sheet S, the temperature and the humidity around image forming apparatus 1, the front and back of sheet S in double-sided printing, the sheet feed tray for feeding sheet S, and the coverage of the image formed on sheet S. When the preset values are registered in each table, control unit 100 corrects the preset values corresponding to the table for registering the preset values according to the image forming conditions.

Control unit 100 can automatically rewrite the preset values by, for example, executing the inspection mode described in Embodiment 1. Control unit 100 can also control the automatic adjustment mode as described in Embodiment 1 to automatically set (generate) or correct (update) the table for registering the preset values.

Figure 10:
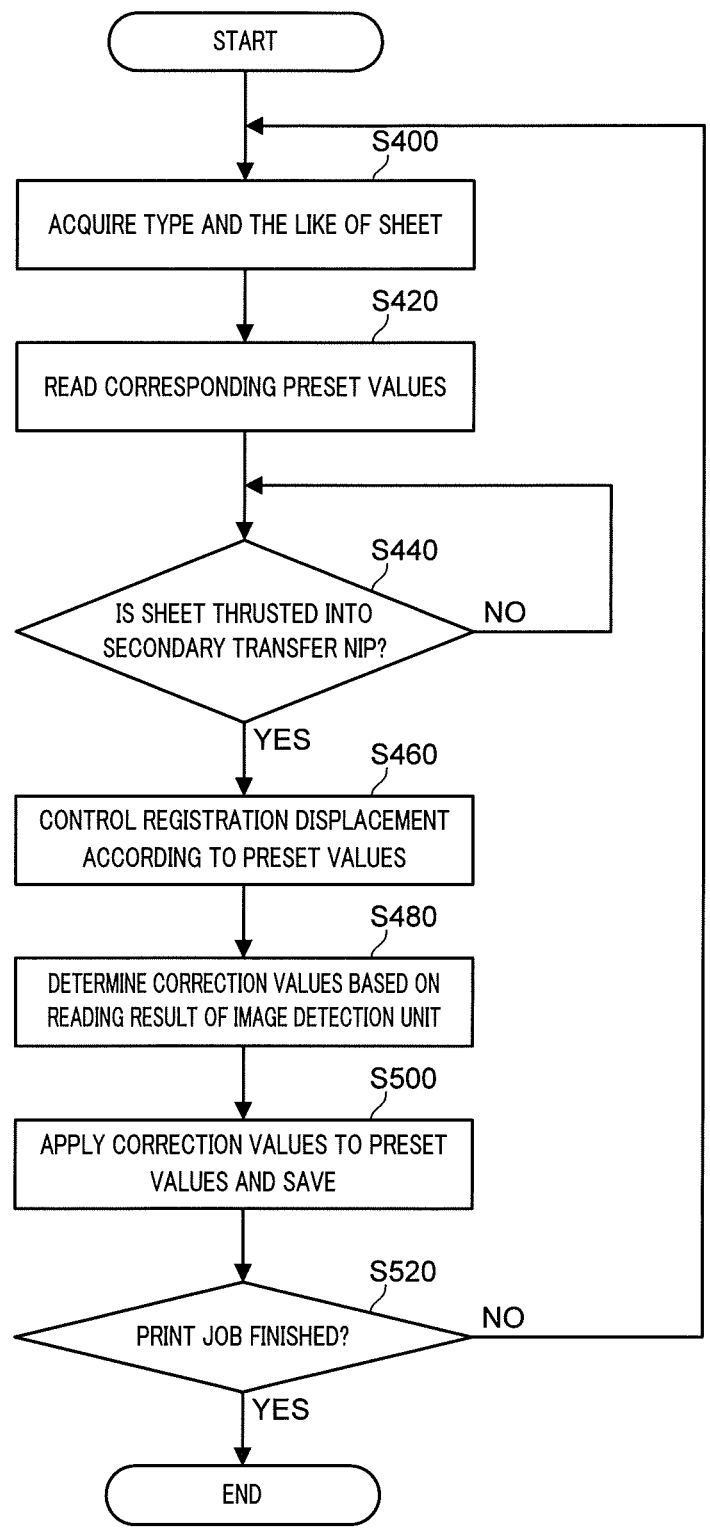
FIG. 10 is a flow chart showing an example of the conveyance control related to the registration displacement in the image forming apparatus of FIG. 8.

Next, an example of operation related to the displacement control of registration roller pair 53a and sheet S in Embodiment 3 will be described with reference to a flow chart of FIG. 10. FIG. 10 is a flow chart showing an operation example of the displacement control in image forming apparatus 1. The process shown in FIG. 10 is an example of control performed when sheets S are long sheets, and the process is executed for each piece of sheets S to be provided with images in the execution of a print job.

At the execution of the print job, control unit 100 acquires information of the type (such as length, width, glossiness of surface, and basis weight (stiffness)) of sheets S to be printed from the user setting information of the print job (step S400). Here, control unit 100 may additionally acquire information of other image forming conditions such as the coverage.

In step S420, control unit 100 reads the preset values registered in the table corresponding to the acquired image forming conditions (type of sheet in this example) and sets the values related to the displacement operation (displacement conditions) of registration roller pair 53a.

In step S440, control unit 100 determines whether sheet S is thrusted into the secondary transfer nip. Here, if control unit 100 determines that sheet S is not thrusted into the secondary transfer nip (step S440, NO), control unit 100 repeatedly executes the determination of step S440. On the other hand, if control unit 100 determines that sheet S is thrusted into the secondary transfer nip (step S440, YES), the control unit 100 moves to step S460.

In step S460, control unit 100 controls the displacement of registration roller pair 53a according to the set values, that is, the preset values. As a result of the control, registration roller pair 53a is displaced with respect to sheet S thrusted into the secondary transfer nip, based on the amount of movement in the width direction, the timing, the speed, the number of times, and the like according to the preset values. Sheet S is displaced in the width direction along with the displacement.

In step S480, control unit 100 obtains the amount of deviation between the intended position in the width direction of the image to be formed on sheet S and the width direction position of the image actually formed on sheet S as described above based on the reading result of image detection unit 80 and determines the correction values according to the amount of deviation.

Subsequently, control unit 100 applies the determined correction values to the preset values and saves the preset values in the memory (RAM 103 or storage unit 72) to update the table for registering the preset values (step S500). As a result of the process, the preset values and the table for registering the preset values are updated so that the amount of displacement of registration roller pair 53a after the front-end of sheet S is thrusted into the secondary transfer nip is corrected according to the amount of positional deviation of the image.

Next, control unit 100 determines whether the print job is finished (step S520). If the print job is not finished as a result of the determination (step S520, NO), control unit 100 returns to step S400 to control the displacement of registration roller pair 53a and execute the printing process, such as image formation, for next sheet S. Therefore, the preset values registered in the table updated in step S500 are used to control the registration displacement in the displacement control of registration roller pair 53a (step S460) for next sheet S.

On the other hand, if the print job is finished (step S520, YES), control unit 100 ends the series of processes.

In this way, according to image forming apparatus 1 of Embodiment 3, the sub scanning obliqueness of sheet S caused by the misalignment, the difference between the diameters of the rollers in the width direction, or the like can be accurately corrected without depending on the detection result of the line sensor. Therefore, according to image forming apparatus 1, the deviation of image and the like caused by the sub scanning direction obliqueness can be prevented.

Furthermore, the same surface sections of sheets S are set at the reference position (see dotted line of FIGS. 3A and 3B) even in the execution of a double-sided printing job, and the influence of differences in individual sheets S, such as variations in external form, obliquity, and twists, can be reduced in image forming apparatus 1 of the present Embodiment.

Furthermore, the image on sheet S is read, and the read information is reflected on the preset values of subsequent sheet S in image forming apparatus 1 of the present Embodiment. Therefore, the registration displacement can be more accurately controlled.

In the configuration example described in FIG. 8, image detection unit 80 is provided in the casing of image forming apparatus 1. In another example, image detection unit 80 may be a unit separate from image forming apparatus 1, and for example, image detection unit 80 may be provided in an external apparatus, such as a post-processing apparatus connected to image forming apparatus 1. In this case, a control unit, such as a CPU, in the post-processing apparatus may determine the correction values of the preset values and execute the process of updating the table. In this case, the table for registering the preset values may also be stored in a memory in the post-processing apparatus.

In the configuration illustrated in Embodiment described above, image detection unit 80 is disposed on the downstream of fixing unit 60 in the sheet conveyance direction. However, it is only necessary that image detection unit 80 be disposed on the downstream of the secondary transfer nip in the sheet conveyance direction.

(Embodiment 4)

Next, Embodiment 4 of image forming apparatus 1 will be described.

As described above, the registration displacement using the fixed values is based on the premise that the sub scanning obliqueness of sheet S is basically constant. However, there may be some conveyance variations in the actual sheet conveyance, and it may not be easy to handle the conveyance variations just by the registration displacement control using only the fixed values.

Therefore, in Embodiment 4, control unit 100 executes first registration displacement control (first control) of controlling the displacement based on the detection result of line sensor 54 that detects the side edge of sheet S, before the front-end of sheet S enters the secondary transfer nip (transfer section). Once the front-end of sheet S enters the secondary transfer nip, control unit 100 executes second registration displacement control (second control) of controlling the displacement by using the preset values defining the displacement conditions of registration roller pair 53a for providing a correct position of the image on sheet S, based on the details of the first control.

In the present Embodiment, control unit 100 executes a process of correcting the preset values according to the amount of displacement and the displacement direction of registration roller pair 53a displaced in the first control. Details of the correction process will be described later.

In the present Embodiment, the registration displacement is controlled in two stages as described above. Therefore, the registration displacement is more accurately controlled while the use of line sensor 54 is reduced, and sheet S, such as a long sheet, can be more linearly conveyed.

The first registration displacement control (first control) in the present Embodiment is basically the same as the control described in FIGS. 3A and 3B. Therefore, an outline of the second registration displacement control (second control) according to the present Embodiment will be described first.

In the second registration displacement control, control unit 100 controls the registration displacement by using the preset values defining the displacement conditions of registration roller pair 53a for providing a correct position of the image on sheet S, without using the values detected in real time by line sensor 54. Therefore, control unit 100 uses the preset values to control registration roller pair 53a to displace sheet S in the width direction orthogonal to the sheet conveyance direction.

Next, the correction process of the preset values will be described.

As described above, control unit 100 corrects the preset values according to the amount of displacement and the displacement direction of registration roller pair 53a displaced in the first control. Specifically, control unit 100 corrects the preset values to reflect the displacement in the first control, that is, the amount of displacement and the displacement direction of registration roller pair 53a displaced before the front-end of sheet S enters the secondary transfer nip. In the correction, control unit 100 may reflect the amount of displacement in the first control on the preset values or may multiply the amount of displacement in the first control by a predetermined coefficient and reflect the value on the preset values. Therefore, the amount of displacement of registration roller pair 53a defined by the corrected preset values may be equal to, greater than, or smaller than the amount of displacement of registration roller pair 53a displaced in the first control. Furthermore, the amount of displacement of registration roller pair 53a defined by the corrected preset values may be greater than, smaller than, or not different from the amount of displacement of registration roller pair 53a defined by the preset values before the correction.

Control unit 100 also corrects the preset values to reflect the details of the displacement operation of registration roller pair 53a in the first control on the details of the displacement operation of registration roller pair 53a in the second control according to the position of sheet S in the conveyance direction.

Specifically, when there are a plurality of displacement points on sheet S set based on the preset values, control unit 100 applies the correction process to each displacement point. In the correction, control unit 100 may reflect the amount of displacement in the first control on each displacement point of the preset values or may multiply the amount of displacement in the first control by a predetermined coefficient and reflect the value on each displacement point of the preset values. Here, the predetermined coefficient can be a value different in each displacement point. For example, the values may be set such that the amount of displacement increases toward the sheet rear-end, or the values may be the opposite of this. The values may also be set such that the amount of displacement is large (or small) in the middle of the sheet in the conveyance direction.

Therefore, the amount of displacement at each displacement point of registration roller pair 53a defined by the corrected preset values may be greater than, smaller than, or not different from before the correction, or the amount of displacement may be greater than (or smaller than) before the correction at some of the displacement points. There can be various cases.

Depending on the detection result of the side edge of sheet S detected by line sensor 54, control unit 100 may displace registration roller pair 53a for a plurality of times in the first control, in other words, there may be a plurality of displacement points on the front-end side of sheet S in the conveyance direction. In this case, control unit 100 specifies the amount of inclination of sheet S based on the detection result of line sensor 54 and corrects the preset values according to the amount of inclination. More specific details of the process will be described later.

Next, the registration displacement control (first control and second control) of the present Embodiment will be described in more detail.

A control method similar to the conventional method is used in the process of the first registration displacement control (first control), that is, the process before the front-end of sheet S is thrusted into the secondary transfer nip, in the present Embodiment. More specifically, once the print job is started in image forming apparatus 1, sheet S is conveyed toward the secondary transfer nip, and line sensor 54 detects the position of the side edge of sheet S when sheet S passes through line sensor 54. At this point, control unit 100 calculates the amount of movement of registration roller pair 53a from the detection result and performs the first control of moving the displacement rollers in the sheet width direction according to the calculation result.

On the other hand, control unit 100 in the present Embodiment specifies or calculates the values (correction values) to be reflected on the preset values during the execution of the first control, that is, before the front-end of sheet S is thrusted into the secondary transfer nip, in order to perform the second control by reflecting the details of the displacement operation of the first control. Note that control unit 100 may execute the correction process of the preset values (that is, update the preset values) before the front-end of sheet S is thrusted into the secondary transfer nip.

In contrast, control unit 100 reads the preset values (predetermined fixed values) at the start of the print job in the second registration displacement control (second control). Control unit 100 corrects the preset values (fixed values) as described above and uses the corrected preset values to set the details of operation of registration roller pair 53a (such as amount of movement, timing, and speed) (see FIG. 4). The reading and the correction of the preset values (fixed values) and the setting of the details of operation of registration roller pair 53a can be performed in the period before sheet S is thrusted into the secondary transfer nip.

After the front-end of sheet S is thrusted into the secondary transfer nip, control unit 100 controls registration roller pair 53a to move in the width direction orthogonal to the conveyance direction of sheet S based on the set details.

Next, details of the control in the present Embodiment when the registration displacement is performed for a plurality of times for one piece of long sheet will be described.

In the first control of the present Embodiment, control unit 100 can displace registration roller pair 53a twice, that is, at two parts of sheet S in the conveyance direction, according to the detection result of line sensor 54, before the front-end of sheet S is thrusted into the secondary transfer nip.

Specifically, for example, control unit 100 temporarily stores the detection value of line sensor 54 and performs the registration displacement control of the first time if the side edge of sheet S is deviated from the reference position (see dotted lines in FIGS. 3A and 3B) when the front-end of sheet S passes through line sensor 54 after being thrusted into the registration nip. Subsequently, control unit 100 performs the registration displacement control of the second time when the side edge of sheet S is deviated from the reference position before the front-end of sheet S is thrusted into the secondary transfer nip. Here, the amount of inclination of sheet S is calculated in the control based on the difference between the detection value of line sensor 54 in the registration displacement control of the second time and the temporarily stored detection value (difference between the amounts of deviation from the reference position). Control unit 100 then calculates the correction values for correcting the preset values based on the calculated amount of inclination of sheet S.

In this way, line sensor 54 is used to perform the first registration displacement control before the front-end of sheet S enters the secondary transfer nip, and the position of the side edge of sheet S can be adjusted according to the conveyance variations on the front-end side of sheet S in the present Embodiment. On the other hand, the fixed values are used to perform the second registration displacement control after the front-end of sheet S enters the secondary transfer nip, and the use of line sensor 54 can be reduced.

The flow of the process of the second registration displacement control (second control) in the present Embodiment, that is, the process after the front-end of sheet S is thrusted into the secondary transfer nip, is as shown in FIG. 5.

More specifically, once the print job is started, control unit 100 reads the preset values (predetermined fixed values) of the plurality of displacement points of sheet S. Control unit 100 then applies the correction values calculated based on the result of the registration displacement in the first control to the preset values and sets the amounts of displacement, the timings of displacement, the speeds of displacement, and the like of registration roller pair 53a for a plurality of times (N times).

Note that the reading and the correction of the preset values and the setting of the displacement operation based on the corrected preset values can be performed at any period before the long sheet is thrusted into the secondary transfer nip in the first displacement and can be performed at any period before the displacement control is started in the second to Nth displacements. Once the front-end of the long sheet is thrusted into the secondary transfer nip, control unit 100 controls registration roller pair 53a to move in the width direction orthogonal to the conveyance direction of sheet S based on the details set for the first displacement and also controls registration roller pair 53a to move in the width direction orthogonal to the conveyance direction of sheet S based on the details set for each of the second to Nth displacements.

In this way, according to the second control of performing the registration displacement by using the preset values reflecting the details of the first control, the sub scanning obliqueness of sheet S can be more accurately corrected. More specifically, the information of the deviation of the side edge of sheet S obtained from the detection result of line sensor 54 is set as the correction values of the registration displacement control (that is, target values of displacement) and fed back to the preset values in the present Embodiment, and the registration displacement can be more accurately controlled according to the conveyance variations.

According to the present Embodiment, the registration displacement can be performed without using line sensor 54 in the second registration displacement control (second control), and the operating time of line sensor 54 per sheet S, particularly, a long sheet, is significantly reduced.

According to the present Embodiment, the registration displacement is performed based on the detection result of line sensor 54 before sheet S is thrusted into the secondary transfer nip. Therefore, the position of the side edge on the front-end side of sheet S can be highly accurately adjusted, and the accuracy of the registration displacement can be guaranteed.

Furthermore, the same surface sections of sheets S are set at the reference position (see dotted line of FIGS. 3A and 3B) even in the execution of the double-sided printing job, and the influence of differences in individual sheets S, such as variations in external form, obliquity, and twists, can be reduced in image forming apparatus 1 of the present Embodiment.

In the present Embodiment, the preset values can be registered in each table set according to various image forming conditions as in Embodiment 1 described above. Here, examples of the image forming conditions include the type of sheet S, the temperature and the humidity around image forming apparatus 1, the front and back of sheet S in double-sided printing, the sheet feed tray for feeding sheet S, and the coverage of the image formed on sheet S. In this case, control unit 100 specifies the image forming conditions from the user setting information, the temperature and humidity sensor, or the like at the execution of the print job and reads the preset values registered in the table corresponding to the specified image forming conditions to control the second registration displacement. When the preset values are corrected and updated as described above, control unit 100 corrects the corresponding preset values of the table registered according to the image forming conditions.

Control unit 100 can automatically rewrite the preset values by, for example, executing the inspection mode described in Embodiment 1. Control unit 100 can also control the automatic adjustment mode as described in Embodiment 1 to automatically set (generate) or correct (update) the table for registering the preset values.

Figure 11:
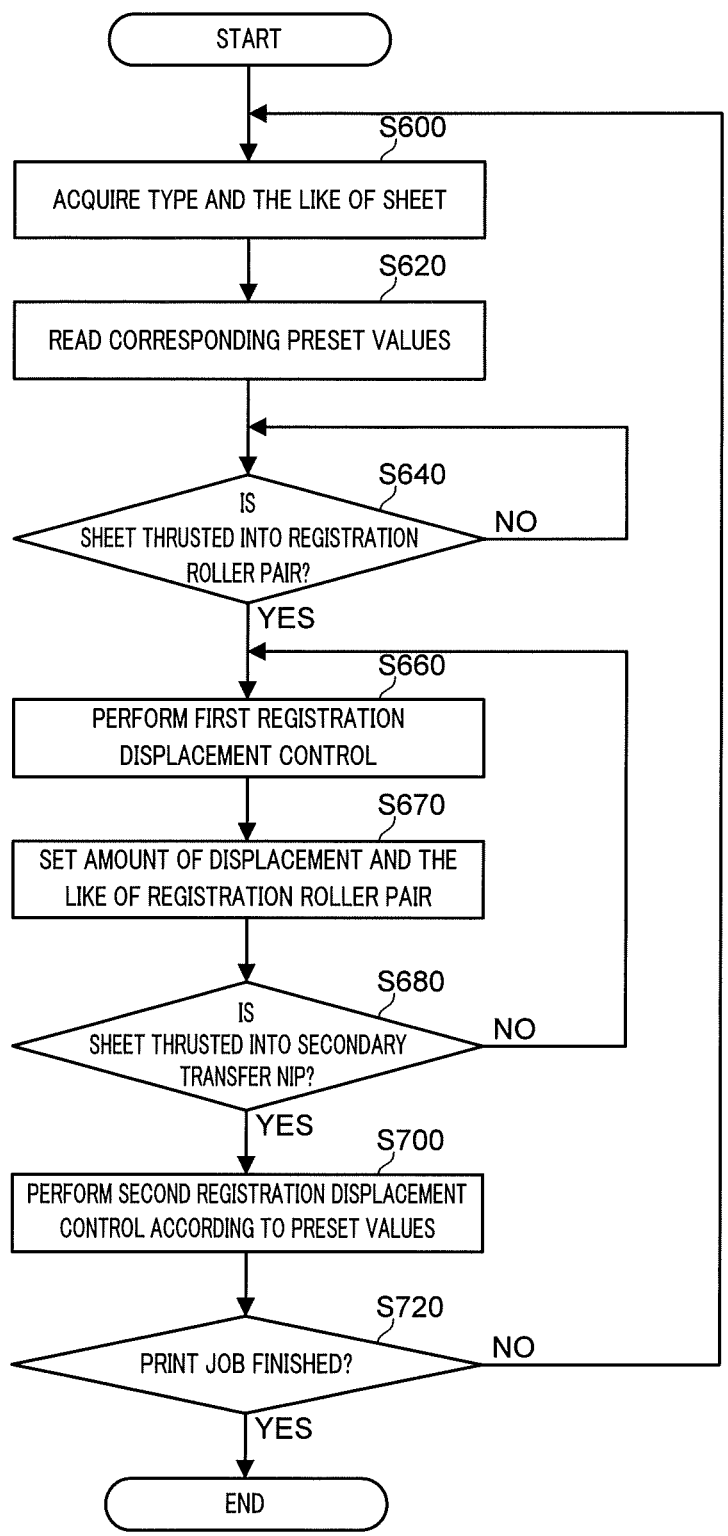
FIG. 11 is a flow chart showing an example of the conveyance control related to the registration displacement of the image forming apparatus according to Embodiment 4.

Hereinafter, an example of operation related to the displacement control of registration roller pair 53a and sheet S in image forming apparatus 1 of the present Embodiment will be described with reference to FIG. 11. FIG. 11 is a flow chart showing an operation example of the displacement control in image forming apparatus 1. The process shown in FIG. 11 is an example of control performed when sheets S are long sheets, and the process is executed for each piece of sheets S to be provided with images in the execution of a print job.

At the execution of the print job, control unit 100 acquires information of the type (such as length, width, and basis weight (stiffness)) of sheets S to be printed from the user setting information of the print job (step S600). Here, control unit 100 may additionally acquire information of other image forming conditions such as the coverage.

In step S620, control unit 100 reads the preset values registered in the table corresponding to the acquired image forming conditions (type of sheet S in this example) and temporarily saves the preset values in the memory (such as RAM 103).

In step S640, control unit 100 determines whether the front-end of sheet S is thrusted into registration roller pair 53*a* (registration nip). Here, if control unit 100 determines that sheet S is not thrusted into the registration nip (step S640, NO), control unit 100 repeatedly executes the determination of step S640. On the other hand, if control unit 100 determines that sheet S is thrusted into the registration nip (step S640, YES), control unit 100 moves to step S660.

In step S660, control unit 100 executes the first control that is registration displacement control based on the detection result of line sensor 54, that is, the position of the side edge of sheet S detected by line sensor 54. The first control can reduce variations in the position of the side edge on the front-end side of sheet S, and the accuracy in the following second control can be guaranteed.

In step S670, control unit 100 sets each value, such as the amount of displacement, related to the displacement operation (displacement conditions) of registration roller pair 53*a* in the second control according to the control results of the first control. More specifically, in step S670, control unit 100 corrects (updates) the temporarily saved preset values based on the direction and the amount of displacement of registration roller pair 53*a* operated in the first control and sets the amount of displacement and the like of registration roller pair 53*a* according to the updated values. As a result of the correction process, the displacement direction and the amount of displacement of registration roller pair 53*a* displaced before the secondary transfer of the image to sheet S are reflected on the second control.

On the other hand, when the displacement operation of registration roller pair 53*a* is not performed in the first control, control unit 100 does not correct the preset values and sets the amount of displacement and the like of registration roller pair 53*a* according to the preset values in step S670.

Subsequently, control unit 100 determines whether sheet S is thrusted into the secondary transfer nip (step S680). Here, if control unit 100 determines that sheet S is not thrusted into the secondary transfer nip (step S680, NO), control unit 100 continues the process of steps S660 and S670. On the other hand, if control unit 100 determines that sheet S is thrusted into the secondary transfer nip (step S680, YES), control unit 100 turns off line sensor 54 and moves to step S700.

In step S700, control unit 100 controls the displacement of registration roller pair 53*a* according to the preset values (updated preset values when the preset values are corrected). As a result of the control, registration roller pair 53*a* is displaced with respect to sheet S thrusted into the secondary transfer nip, based on the amount of movement in the width direction, the timing, the speed, the number of times, and the like according to the preset values reflecting the control results in the first control. Sheet S is displaced in the width direction along with the displacement.

In this way, the second control is performed based on the preset values reflecting the amount of displacement of registration roller pair 53*a* in the first control (that is, control of adjusting the side edge of sheet S) before the front-end of sheet S enters the secondary transfer nip, and accuracy in the second control can be further increased.

Furthermore, line sensor 54 is turned off during the execution of the second control, and this can realize the control of the registration displacement for correcting the sub scanning obliqueness of sheet S while reducing the use of line sensor 54.

Next, control unit 100 determines whether the print job is finished (step S720). As a result of the determination, if the print job is not finished (step S720, NO), control unit 100 returns to step S600 and performs the first and second displacement control of registration roller pair 53*a* and the printing process, such as image formation, for next sheet S.

On the other hand, if the print job is finished (step S720, YES), control unit 100 ends the series of processes.

In this way, the first registration displacement control based on the detection result of line sensor 54 is performed before the front-end of sheet S enters the secondary transfer nip in Embodiment 4, and the position of the side edge of sheet S can be adjusted according to the conveyance variations on the front-end side of sheet S prior to the registration displacement control based on the fixed values.

According to Embodiment 4, the result of the first registration displacement control is reflected on the second registration displacement control, and this can contribute to the improvement in the accuracy of the registration displacement.

Overall, according to Embodiment 4, the sub scanning obliqueness of sheet S caused by the misalignment, the difference between the diameters of the rollers in the width direction, or the like can be corrected while the use of line sensor 54 is reduced. Therefore, according to the present Embodiment, the generation of deviation of image or the like caused by the sub scanning direction obliqueness can be prevented.

In the example described in each Embodiment described above, the image forming apparatus includes the transfer section that uses intermediate transfer belt 421 to secondarily transfer the image to be printed to sheet S. Embodiments described above can be similarly applied to an image forming apparatus (such as a monochrome printer) of a transfer system that primarily transfers the image to be printed to sheet S.

In the case described in each Embodiment described above, the sheet conveyance members provided on the upstream of the secondary transfer nip and subjected to the displacement control by control unit 100 are registration roller pair 53*a*. In another example, rollers, sheet conveyance guides, and the like other than registration roller pair 53*a* can be additionally or alternatively applied as the sheet conveyance members.

In the case described in each Embodiment described above, pieces of paper are used as sheets S. Embodiments described above can be similarly applied to rolled paper.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus comprising:
   a transferer that transfers an image to a sheet;
   a sheet conveyance member that is provided on an upstream of the transferer in a sheet conveyance direction and that conveys the sheet; and
   a hardware processor that controls the sheet conveyance member to displace the sheet, wherein
   a preset value defining a displacement condition of the sheet conveyance member for providing a correct position of the image on the sheet is set, the hardware processor moves the sheet conveyance member to displace the sheet based on the preset value and without current information from a line sensor, and the preset value is a value defining the displacement condition of the sheet conveyance member after a front-end of the sheet is thrusted into the transferer.

2. The image forming apparatus according to claim 1, wherein the hardware processor controls the sheet conveyance member to move the sheet in a width direction orthogonal to the sheet conveyance direction based on the preset value.

3. The image forming apparatus according to claim 1, wherein the preset value includes a value indicating an amount of movement of the sheet conveyance member in the width direction.

4. The image forming apparatus according to claim 1, wherein the preset value includes a value indicating a displacement timing of the sheet conveyance member.

5. The image forming apparatus according to claim 4, wherein the preset value includes a value indicating an amount of movement of the sheet conveyance member in the width direction at the displacement timing.

6. The image forming apparatus according to claim 4, wherein the preset value includes a value indicating a movement speed of the sheet conveyance member at the displacement timing.

7. The image forming apparatus according to claim 1, wherein the hardware processor refers to a table for registering the preset value to control the sheet conveyance member.

8. The image forming apparatus according to claim 7, wherein the table is provided according to a type of the sheet.

9. The image forming apparatus according to claim 7, wherein the table is provided according to temperature and humidity around the image forming apparatus.

10. The image forming apparatus according to claim 7, wherein the table is provided according to front and back of the sheet.

11. The image forming apparatus according to claim 7, wherein the table is provided for each sheet feed tray.

12. The image forming apparatus according to claim 7, wherein the table is provided according to coverage of the image formed on the sheet.

13. The image forming apparatus according to claim 7, wherein the hardware processor generates or updates the table according to a detection result of a detection unit that detects an edge of the sheet in the width direction, the sheet provided with the image transferred by the transferer.

14. The image forming apparatus according to claim 1, wherein the hardware processor updates the preset value according to a use history of the sheet conveyance member.

15. The image forming apparatus according to claim 1, wherein the hardware processor updates the preset value according to an instruction of a user.

16. A conveyance control method of an image forming apparatus comprising: a transferer that transfers an image to a sheet; and a sheet conveyance member that is provided on an upstream of the transferer in a sheet conveyance direction and that conveys the sheet, the conveyance control method comprising:

displacing the sheet conveyance member based on a preset value defining a displacement condition of the sheet conveyance member for providing a correct position of the image on the sheet, and the displacing of the sheet conveyance member being based on the preset value without current information from a line sensor, the preset value being a value defining the displacement condition of the sheet conveyance member after a front-end of the sheet is thrusted into the transferer.

17. An image forming apparatus comprising:
a transferer that transfer an image to a sheet;
a sheet conveyance member that is provided on an upstream of the transferer in a sheet conveyance direction and that conveys the sheet;
a hardware processor that uses a preset value defining a displacement condition of the sheet conveyance member for providing a correct position of the image on the sheet to thereby control the sheet conveyance member to displace the sheet in a width direction orthogonal to the sheet conveyance direction;
the hardware processor moves the sheet conveyance member to displace the sheet based on the preset value and without current information from a line sensor, wherein
the hardware processor operates a detection unit that detects an edge of the sheet in the width direction at a predetermined timing to correct the preset value based on a detection result of the detection unit, and
the preset value is a value defining the displacement condition of the sheet conveyance member after a front-end of the sheet is thrusted into the transferer.

18. An image forming apparatus comprising:
a transferer that transfers an image to a sheet;
a sheet conveyance member that is provided on an upstream of the transferer in a sheet conveyance direction;
a hardware processor that uses a preset value defining a displacement condition of the sheet conveyance member for providing a correct position of the image on the sheet to thereby control displacement of the sheet conveyance member to displace the sheet in a width direction orthogonal to the sheet conveyance direction;
the hardware processor moves the sheet conveyance member to displace the sheet based on the preset value and without current information from a line sensor, wherein
the hardware processor uses a value obtained by correcting the preset value based on a reading result of an image reading unit that reads the image on the sheet to control the displacement for a subsequent sheet, and
the preset value is a value defining the displacement condition of the sheet conveyance member after a front-end of the sheet is thrusted into the transferer.

19. An image forming apparatus comprising:
a transferer that transfers an image to a sheet;
a sheet conveyance member that is provided on an upstream of the transferer in a sheet conveyance direction; and
a hardware processor that controls displacement of the sheet conveyance member to displace the sheet in a width direction orthogonal to the sheet conveyance direction, wherein
the hardware processor:
executes first control of controlling the displacement based on a detection result of a detection unit that detects an edge of the sheet in the width direction before a front-end of the sheet enters the transferer, and
executes, based on details of the first control, second control of controlling the displacement by using a preset value defining a displacement condition of the sheet conveyance member for providing a correct position of the image on the sheet after the front-end of the sheet enters the transferer, the second control being performed based on the preset value and without current information from a line sensor, and the preset value is a value defining the displacement condition of the sheet conveyance member after the front-end of the sheet is thrusted into the transferer.

\* \* \* \* \*